(12) United States Patent
Li et al.

(10) Patent No.: US 12,497,546 B2
(45) Date of Patent: Dec. 16, 2025

(54) ADHESIVE SHEET AND METHOD FOR MANUFACTURING SAME, ARTICLE, AND METHOD FOR MANUFACTURING ARTICLE

(71) Applicant: 3M INNOVATIVE PROPERTIES COMPANY, St. Paul, MN (US)

(72) Inventors: Guanqiao Li, Sagamihara (JP); Tomoaki Uchiya, Tokyo (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 205 days.

(21) Appl. No.: 18/572,332

(22) PCT Filed: Jun. 17, 2022

(86) PCT No.: PCT/IB2022/055662
§ 371 (c)(1),
(2) Date: Dec. 20, 2023

(87) PCT Pub. No.: WO2023/275657
PCT Pub. Date: Jan. 5, 2023

(65) Prior Publication Data
US 2024/0309245 A1    Sep. 19, 2024

(30) Foreign Application Priority Data

Jun. 30, 2021 (JP) .................. 2021-109167

(51) Int. Cl.
*C09J 7/35* (2018.01)
*C09J 163/00* (2006.01)

(52) U.S. Cl.
CPC .............. *C09J 7/35* (2018.01); *C09J 163/00* (2013.01); *C09J 2301/1242* (2020.08);
(Continued)

(58) Field of Classification Search
CPC .............. C09J 163/00; C09J 2301/1424; C09J 2400/024; C09J 7/30; C09J 2463/00
See application file for complete search history.

(56) References Cited

U.S. PATENT DOCUMENTS

2018/0134926 A1   5/2018 Lei et al.
2019/0010361 A1*  1/2019 Hoshi ................ C09J 163/00
(Continued)

FOREIGN PATENT DOCUMENTS

JP   2013023559 A      2/2013
JP   2013104044 A  *   5/2013
(Continued)

OTHER PUBLICATIONS

Fedors, "A Method for Estimating Both the Solubility Parameters and Molar Volumes of Liquids", Polymer Engineering and Science, Feb. 1974, vol. 14, No. 2, pp. 147-154.
(Continued)

*Primary Examiner* — Daniel McNally
(74) *Attorney, Agent, or Firm* — Gregg H. Rosenblatt

(57) ABSTRACT

An adhesive sheet can ensure favorable ease of insertion even when inserted and used into a narrow space, and can also favorably exhibit various characteristics during or after heating. An adhesive sheet includes a first adhesive layer formed of an adhesive composition containing an epoxy resin having a softening point of 50° C. or higher and a thermal curing agent; and a second adhesive layer that has tackiness and is foamed and cured by heat. An outermost layer of the adhesive sheet is formed of the first adhesive layer, and the adhesive sheet has a plurality of convex structures on a surface on a side of the outermost layer.

11 Claims, 18 Drawing Sheets

(52) U.S. Cl.
CPC .... *C09J 2301/304* (2020.08); *C09J 2301/312* (2020.08); *C09J 2301/50* (2020.08); *C09J 2400/24* (2013.01); *C09J 2463/00* (2013.01); *C09J 2467/006* (2013.01)

(56) References Cited

U.S. PATENT DOCUMENTS

| | | |
|---|---|---|
| 2021/0207010 A1 | 7/2021 | Takagi et al. |
| 2023/0131701 A1* | 4/2023 | Uchiya .................... C09J 7/35 442/150 |

FOREIGN PATENT DOCUMENTS

| | | | |
|---|---|---|---|
| JP | 2019157136 A | 9/2019 | |
| JP | 2019203062 A | 11/2019 | |
| JP | 2020021585 A | 2/2020 | |
| WO | 2001029144 A1 | 4/2001 | |
| WO | 2015115570 A1 | 8/2015 | |
| WO | 2015190235 A1 | 12/2015 | |
| WO | 2018165544 A1 | 9/2018 | |
| WO | 2019226819 A1 | 5/2019 | |
| WO | 2021161118 A1 | 8/2021 | |

OTHER PUBLICATIONS

International Search report for PCT International Application No. PCT/IB2022/05566, mailed on Sep. 2, 2022, 5 pages.

\* cited by examiner

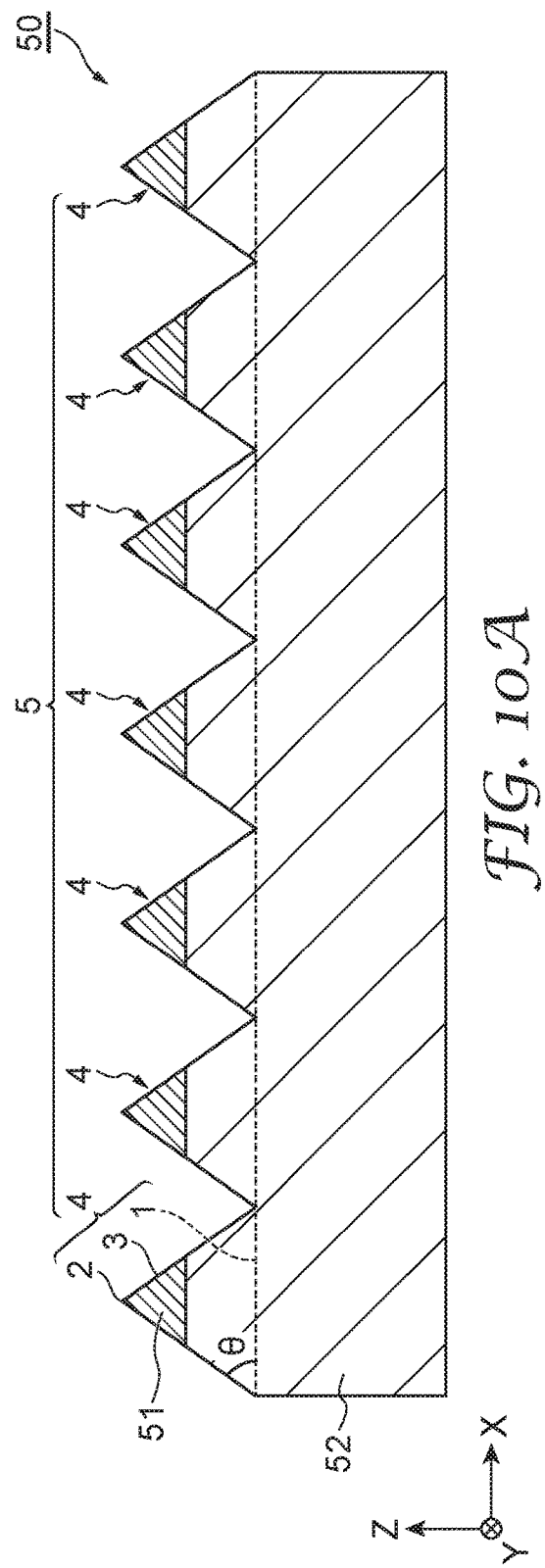
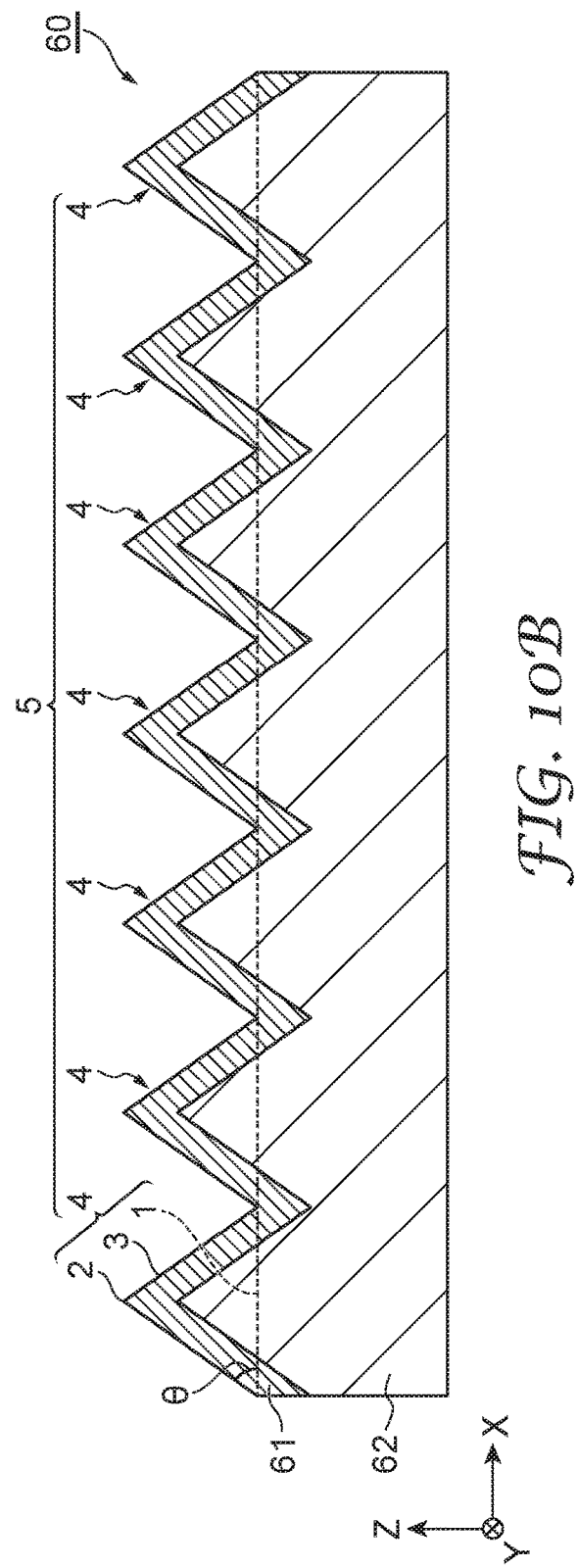

ADHESIVE SHEET AND METHOD FOR MANUFACTURING SAME, ARTICLE, AND METHOD FOR MANUFACTURING ARTICLE

TECHNICAL FIELD

The present invention relates to an adhesive sheet and a method for manufacturing the same, an article, and a method for manufacturing the article.

BACKGROUND

An adhesive sheet has been used so far to adhere adherends to each other. The performance required of the adhesive sheet varies depending on the application. For example, in the case of an adhesive sheet used to be inserted into a narrow space such as a slot of an EV motor, it is necessary to achieve sufficiently high adhesion after adhesion, and, additionally, to achieve excellent ease of insertion and the like.

For example, reference JP 2013-23559 A proposes a thermosetting, thermally expandable adhesive sheet including: a substrate having a first surface and a second surface opposite to the first surface and having a communication opening; and a first adhesive layer formed on the first surface of the substrate and containing a thermosetting, thermally expandable epoxy adhesive, wherein the thermosetting, thermally expandable epoxy adhesive passes through the communication opening of the substrate when heated and forms a second adhesive layer on the second surface of the substrate, as an adhesive sheet that is inserted into a slot of a rotor core of an IPM (Interior Permanent Magnet) motor and adheres to the rotor core and magnet.

For example, reference JP 2019-203062 A proposes a thermally expandable adhesive sheet including: a substrate, two thermally expandable adhesive layers provided on both sides of the substrate; and two adhesive permeable layers provided on surfaces of the two respective adhesive layers, and are capable of permeating an adhesive upon thermal expansion of the adhesive, as an adhesive sheet that is inserted into a slot of a stator body of a motor and adhesives a stator and a coil.

SUMMARY

The substrate having the communication opening and the adhesive permeable layer, described above, are not so-called adhesives, and do not contribute to adhesivity and the like. The adhesive sheet used to be inserted into a narrow space, as described above, is also expected to be improved in adhesive performance, and affords room for performance improvement in terms of effective use of the narrow space.

The present inventors have attempted to develop an adhesive sheet used to be inserted into a narrow space as described above by a different technique than the techniques disclosed in the aforementioned references. However, for example, when a thermosetting adhesive which is substantially non-tacky at room temperature (e.g., an adhesive including a thermosetting resin having a softening point of 50° C. or higher) is simply used in order to ensure favorable ease of insertion, the selection of various components is restricted, and reactivity, foamability, adhesivity, and other various characteristics required of adhesive sheets during or after heating may continue to be restricted.

An object of the present disclosure is to provide an adhesive sheet that can ensure favorable ease of insertion even when inserted and used into a narrow space, and can also favorably exhibit various characteristics during or after heating, and a method for manufacturing the same. Another object of the present disclosure is to provide an article including such an adhesive sheet and a method for manufacturing an article using such an adhesive sheet.

Specifically, the present disclosure provides the following.

In one aspect of the disclosure, an adhesive sheet includes: a first adhesive layer formed of an adhesive composition containing an epoxy resin having a softening point of 50° C. or higher and a thermal curing agent; and a second adhesive layer that has tackiness and is foamed and cured by heat, wherein at least one outermost layer is formed of the first adhesive layer, and the adhesive sheet has a plurality of convex structures on a surface on a side of the outermost layer formed of the first adhesive layer.

In another aspect of the disclosure, the outermost layer formed of the first adhesive layer is made of a molded body of the adhesive composition.

In another aspect of the disclosure, the outermost layer formed of the first adhesive layer is made of a deposit of the adhesive composition in powder form.

In another aspect of the disclosure, the convex structures have a height from 2 to 200 μm.

In another aspect of the disclosure, the adhesive sheet further comprises a substrate layer as an intermediate layer.

In another aspect of the disclosure, one outermost layer is formed of the second adhesive layer.

In another aspect of the disclosure, both outermost layers are formed of the first adhesive layer, and the adhesive sheet has the plurality of convex structures on both surfaces.

In another aspect of the disclosure, an article includes: the adhesive sheet described above and an adherend having the adhesive sheet attached thereto.

In another aspect of the disclosure, a method for manufacturing an adhesive sheet having a plurality of convex structures on a surface includes:
  a step of molding a first adhesive layer by applying a solution containing an epoxy resin having a softening point of 50° C. or higher and a thermal curing agent onto a surface of a mold having a plurality of concave structures on the surface, and
  a step of providing a second adhesive layer that has tackiness and is foamed and cured by heat, on a side of the first adhesive layer opposite to the mold.

In another aspect of the disclosure, a method for manufacturing an adhesive sheet having a plurality of convex structures on a surface includes:
  a step of forming an adhesive layer that has tackiness and is foamed and cured by heat, on a surface of a mold having a plurality of concave structures on the surface, and thus forming a plurality of convex structures on a surface of the adhesive layer; and
  a step of depositing, on the surface of the adhesive layer, a powdery adhesive composition containing an epoxy resin having a softening point of 50° C. or higher and a thermal curing agent.

In another aspect of the disclosure, a method for manufacturing an article including a first element, a second element, and a filling portion that fills a space between the first element and the second element includes:
  a step of disposing the adhesive sheet described above between the first and second elements; and
  a step of thermally expanding and curing the adhesive sheet by heating to form the filling portion.

The present disclosure can provide an adhesive sheet that can ensure favorable ease of insertion even when inserted and used into a narrow space, and can also favorably exhibit various characteristics during or after heating, and a method for manufacturing the same. Further, the present disclosure can provide an article including such an adhesive sheet and a method for manufacturing an article using such an adhesive sheet.

BRIEF DESCRIPTION OF THE DRAWINGS

FIG. 10 is a cross-sectional view illustrating an adhesive sheet according to another embodiment.

DETAILED DESCRIPTION

Figure 1:
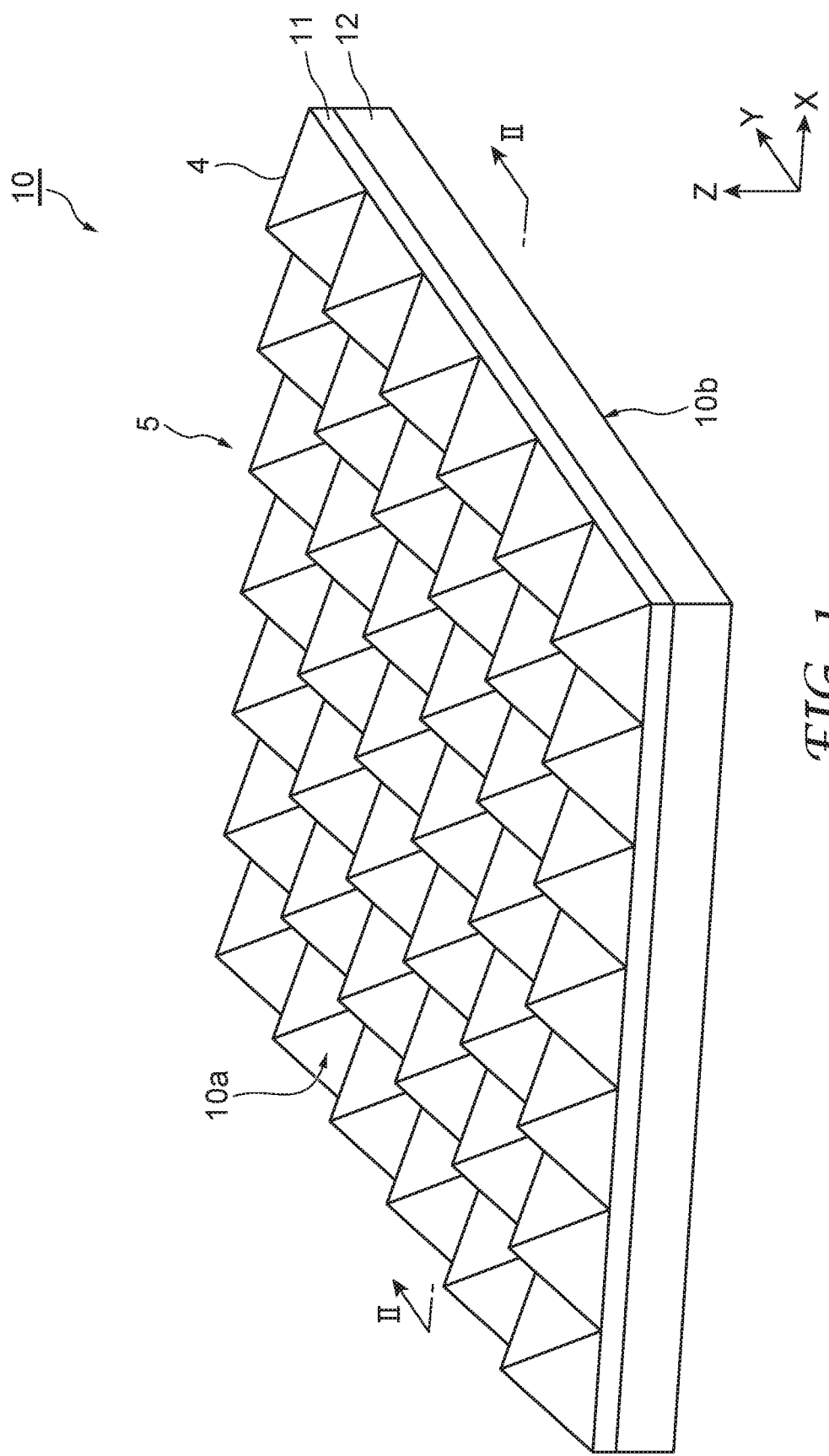
FIG. 1 is a perspective view of an adhesive sheet according to an embodiment.

In the present specification, numerical ranges indicated using "to" indicate ranges that include numerical values described before and after "to" as a minimum value and a maximum value, respectively. In numerical ranges described stepwise in the present specification, an upper or lower limit of a numerical range at a stage may be replaced by an upper or lower limit of a numerical range at another stage. Also, in a numerical range described in the present specification, an upper or lower limit of the numerical range may be replaced by values shown in an Example. Also, upper and lower limits described individually are optionally combinable. In the present specification, "(meth)acrylic" means at least one of "acrylate" and "methacrylate" corresponding thereto.

The adhesive sheet of an embodiment includes at least one first adhesive layer and at least one second adhesive layer. When there are a plurality of first adhesive layers, the first adhesive layers may be the same or different. When there are a plurality of second adhesive layers, the second adhesive layers may be the same or different.

At least one of the first adhesive layers constitutes an outermost layer of the adhesive sheet. In other words, at least one of two outermost layers of the adhesive sheet is formed of the first adhesive layer.

The other outermost layer may be the first adhesive layer or a layer other than the first adhesive layer (e.g., a second adhesive layer). Note, in the present specification, the "outermost layer" is a layer that is located on the outermost side of the adhesive sheet, the layer being initially contacted to a target object when the adhesive sheet of the present disclosure approaches the target object. The adhesive sheet has a plurality of convex structures on a surface on aside of the outermost layer formed of the first adhesive layer.

(First Adhesive Layer)

The first adhesive layer is formed of a first adhesive composition containing an epoxy resin and a thermal curing agent. The first adhesive composition contains an epoxy resin and a thermal curing agent, and thus has thermosetting properties.

A softening point of the epoxy resin contained in the first adhesive layer is 50° C. or higher. Thus, the first adhesive layer is substantially non-tacky. Here, "the first adhesive layer is substantially non-tacky" means that the first adhesive layer is not attached to SPCC-SB (cold rolled steel sheet) even when brought into contact with SPCC-SB at room temperature (e.g., 25° C.).

It can be confirmed that the first adhesive layer has such properties, for example, by measuring a coefficient of dynamic friction of the surface of the first adhesive layer. The coefficient of dynamic friction is measured in accordance with JIS K7125 "Plastics and Films—Determination of the coefficients of friction". The coefficient of dynamic friction of the surface of the first adhesive layer is, for example, 0.8 pd or less. An upper limit of the softening point of the epoxy resin is not particularly limited, but is preferably not higher than an activation temperature of the thermal curing agent, and is, for example, 150° C. or lower. The softening point of the epoxy resin is measured using the ring and ball softening point method specified in JIS K2207.

Examples of the epoxy resin can include those obtained from an epoxy compound (monomer epoxy compound or polymer epoxy compound) having at least one oxirane ring that can be polymerized by a ring-opening reaction. The epoxy compound may be aliphatic, cycloaliphatic, aromatic, or heterocyclic. The epoxy compound may have at least 2, more preferably 2 to 4 polymerizable epoxy groups per molecule. An average epoxy equivalent weight of the epoxy resin may be from 80 to 1000 or from 90 to 600 from the perspective of obtaining more excellent adhesivity. The average epoxy equivalent is a value determined in accordance with JIS K7236.

The epoxy resins include bisphenol epoxy resins such as bisphenol A epoxy resin, dimer acid-modified bisphenol A epoxy resin, and bisphenol F epoxy resin; epoxy resins with a fatty acid backbone such as hexanediol glycidyl ether; glycidyl amine epoxy resins such as p-aminophenol triglycidyl; novolac epoxy resins such as phenol novolac epoxy resin and creosol novolac epoxy resin; brominated epoxy resins; cyclic epoxy resins; and blends thereof. In a preferred aspect, the epoxy resin is a bisphenol epoxy resin, a glycidylamine epoxy resin, and a novolac epoxy resin.

A plurality of epoxy resins can be blended in order to adjust the softening point of the epoxy resin. In this case, the softening point of the mixture of the plurality of epoxy resins is 50° C. or higher. The first adhesive layer may contain an epoxy resin having a softening point of lower than 50° C. in a range in which the effects of the present invention are not inhibited, that is, in such an amount that the softening point of the blended epoxy resin to 50° C. or higher.

From the perspective of obtaining more excellent adhesivity, a content of the epoxy resin may be 30 mass % or greater, 50 mass % or greater, or 70 mass % or greater, based on a total mass of the first adhesive composition. The content of the epoxy resin may be 70 mass % or less, 50 mass % or less, or 30 mass % or less, based on the total mass of the first adhesive composition, from the perspective of favorably obtaining the advantage of the other containing components. From these perspectives, the content of the epoxy resin may be from 30 to 70 mass %, based on the total mass of the first adhesive composition.

As a thermal curing agent, various thermal curing agents known in the art to be usable as thermal curing agents for an epoxy resin can be used. Examples of the thermal curing agent include a compound that react with an oxylane ring of epoxide to cause substantial cross-linking of the epoxide to form a crosslinked polymer network. These compounds contain at least one nucleophilic or electrophilic moiety (for example, active hydrogen atom) which causes a crosslinking reaction. As understood by one of ordinary skill in the art, the thermal curing agent and the curing accelerator are often indistinguishable from each other. Thus, the thermal curing agent of the present disclosure also includes a curing accelerator. In a preferred aspect, the thermal curing agent also includes a curing accelerator to increase an epoxide curing reaction rate. In the typical aspect, the curing accelerator is a multifunctional compound.

The thermal curing agent is, for example, a latent curing agent which is inactive around room temperature and activated by heating. Examples of the latent curing agent include dicyandiamide and a derivative thereof, a hydrazide compound, a boron trifluoride-amine complex, and a reaction product of an amine compound with an isocyanate compound or a urea compound (urea derivative). A latent curing accelerator may be used in combination with an epoxy resin curing agent. Examples of the curing accelerator include an imidazole compound, a reaction product of an amine compound with an epoxy compound (amine-epoxy adduct), a urea derivative, and the like. Preferably, the thermal curing agent is dicyandiamide.

A content of the thermal curing agent may be from 0.1 to 80 parts by mass, from 1 to 60 parts by mass, or from 3 to 50 parts by mass, relative to 100 parts by mass of the epoxy resin, from the perspective of realizing the favorable cross-linking reaction of the epoxy resin and obtaining more excellent adhesivity.

The first adhesive composition may further contain components other than the components described above. Examples of optional components include plasticizers, core shell toughening agents, and fillers.

A total thickness of the first adhesive layer may be set according to a width of a space (slot) into which the adhesive sheet is inserted and a total thickness of the corresponding second adhesive layer. The total thickness of the first adhesive layer is, for example, from 2 to 400 μm, and may be from 5 to 200 μm.

(Second Adhesive Layer)

The second adhesive layer is a layer that has tackiness and is foamed and cured by heat. Here, "the second adhesive layer has tackiness" means that the second adhesive layer is attached to SPCC-SB (cold rolled steel sheet) when brought into contact with SPCC-SB at room temperature (e.g., 25° C.). Therefore, when an evaluation value in tack evaluation which will be described below is 1, the second adhesive layer can be said to have tackiness.

The second adhesive layer is formed of a second adhesive composition containing, for example, an adhesive component and a thermal foaming agent. The adhesive component may be composed of components that impart tackiness and thermosetting properties to the second adhesive layer. The first adhesive layer is required to be substantially non-tacky (have a low coefficient of dynamic friction of the surface at room temperature) as described above, while the second adhesive layer does not have such a requirement, and thus, there are less restrictions on selection of various components, when developing high adhesivity upon thermosetting. Therefore, the second adhesive layer normally is superior to the first adhesive layer in terms of adhesivity after heat curing (e.g., shear strength when SPCC-SB is used as an adherend, which is evaluated by a method which will be described in the Examples). The adhesive component contains, for example, an epoxy resin, a (meth)acrylate polymer, and a thermal curing agent.

Examples of the epoxy resin include compounds exemplified as the epoxy resins contained in the first adhesive composition (first adhesive layer). A softening point of the epoxy resin in the second adhesive composition need not be 50° C. or higher, and may be lower than 50° C. (e.g., 0° C. or higher and lower than 50° C.).

From the perspective of obtaining more excellent adhesivity, a content of the epoxy resin may be 20 mass % or greater, 30 mass % or greater, 35 mass % or greater, or 40 mass % or greater, based on a total mass of the second adhesive composition. The content of the epoxy resin may be 60 mass % or less, 55 mass % or less, or 50 mass % or less, based on the total mass of the second adhesive composition, from the perspective of favorably obtaining the advantage of the other containing components. From these perspectives, the content of the epoxy resin may be from 20 to 60 mass % or from 30 to 60 mass %, based on the total mass of the second adhesive composition.

The (meth)acrylate polymer is a polymer including units derived from (meth)acrylate monomers ((meth)acrylate units). The (meth)acrylate polymer preferably has a cycloaliphatic (meth)acrylate unit and a glycidyl (meth)acrylate unit. Examples of the cycloaliphatic (meth)acrylate unit include dicyclopentanyl (meth)acrylate and cyclohexyl (meth)acrylate.

The (meth)acrylate polymer preferably includes units derived from (meth)acrylate monomers having a solubility parameter value (SP value) of less than 10, in a total amount of 50 mass % or greater or 70 mass % or greater. In the present specification, as the solubility parameter values, intended are Fedors solubility parameters at 25° C. (see Fedors, Polym. Eng. And Sci., 14, 147 (1974)). In a preferred aspect, the (meth)acrylate polymer is substantially solely derived from (meth)acrylate monomers having a solubility parameter value of less than 10. The (meth)acrylate monomer having a solubility parameter value of less than 10 tends to have low hygroscopicity, which is advantageous from the perspective of reducing the hygroscopicity of the adhesive.

Examples of the (meth)acrylate monomer having a solubility parameter value of less than 10 can include glycidyl methacrylate (solubility parameter value: 9.79), dicyclopentanyl acrylate (solubility parameter value: 9.66), dicyclopentanyl methacrylate (solubility parameter value: 9.60), dicyclopentenyl acrylate (solubility parameter value: 9.71), tetrahydrofurfuryl acrylate (solubility parameter value: 9.51), tetrahydrofurfuryl methacrylate (solubility parameter value: 9.45), cyclic trimethylpropane formyl acrylate (solubility parameter value: 9.35), and cyclohexyl acrylate (solubility parameter value: 9.26).

A content of the (meth)acrylate polymer may be 12 mass % or greater, 15 mass % or greater, or 18 mass % or greater, based on the total mass of the second adhesive composition, from the perspective of handleability of the adhesive sheet. The content of the (meth)acrylate polymer may be 35 mass % or less, 30 mass % or less, or 25 mass % or less, based on the total mass of the second adhesive composition, from the perspective of facilitating the setting of a viscosity at a curing temperature. From these perspectives, the content of the (meth)acrylate polymer may be from 12 to 35 mass %, based on the total mass of the second adhesive composition.

Examples of the thermal curing agent include compounds exemplified as the thermal curing agent contained in the first adhesive composition (first adhesive layer). A content of the thermal curing agent in the second adhesive composition may be selected within the range exemplified as the content of the thermal curing agent in the first adhesive composition.

A variety of materials that cause foaming by heat can be used as the thermal foaming agent. As understood by those skilled in the art, the thermal foaming agent and the thermal expansion material are often indistinguishable from each other. Thus, the thermal foaming agent generally includes materials commonly referred to as thermal expansion materials. The thermal foaming agent is incorporated in the second adhesive composition, which can impart thermal foaming properties to the second adhesive layer.

Examples of the thermal foaming agent include chemical foaming agents, encapsulated thermal expansion materials, and expanded graphite. The encapsulated thermal expansion material is preferred, from the perspective of preventing gas or liquid from permeating the adhesive during and after curing and favorably preventing the deterioration in adherend.

The encapsulated thermal expansion material typically includes a shell of thermoplastic polymer and a liquefied gas enclosed within the shell. Examples of the thermoplastic polymer include vinylidene chloride polymer, acrylonitrile copolymer, and acrylic polymer. Examples of the liquefied gas include trichlorofluoromethane and hydrocarbons (e.g., n-pentane, isopentane, neopentane, butane, and isobutane). Typical behaviors when the encapsulated thermal expansion material is heated are as follows. That is, heating the encapsulated thermal expansion material causes the capsule to be expanded due to softening of the shell and increase in internal pressure caused by gasification of liquefied gas. Along with increase in temperature, the capsule is expanded (i. e., the balloon is formed); the capsule volume is maximized; thereafter, when the temperature further increases, the gas inside the capsule permeates and diffuses due to thinning of the shell; and the capsule volume starts to decrease (that is, the capsule contracts). Typically, the encapsulated thermal expansion material is appropriately designed in material and dimensions for the control of temperature at which the capsule volume is maximized.

A ratio of maximum value to minimum value of the capsule volume as indicated when varying the temperature of the encapsulated thermal expansion material is preferably twice or more, or three times or more, from the perspective of imparting favorable thermal expansion performance to the adhesive, and is preferably 100 times or less or 50 times or less, from the perspective of avoiding inconveniences such as protrusion from the adherend due to excessive increase in volume of the adhesive.

A temperature at which the volume change occurs (also referred to herein as expansion start temperature) when the encapsulated thermal expansion material is heated may be 70° C. or higher, 80° C. or higher, or 90° C. or higher from the perspective of avoiding shrinkage of the adhesive before completion of curing thereof, and may be 160° C. or lower, 150° C. or lower, or 140° C. or lower from the perspective of causing expansion during curing heating.

An average particle size of the encapsulated expansion material is, for example, from 1 to 50 µm, and may be from 3 to 30 µm or from 5 to 20 µm. The average particle size of the encapsulated expansion is a value measured by laser diffraction.

The encapsulated thermal expansion material may be a commercially available product, for example, FN-80GSD, FN-100SD, and FN-100MD (all available from Matsumoto Yushi-Seiyaku Co., ltd.), EML101 and EMH204 (both available from Sekisui Chemical Co., Ltd.), and 461DU40 and 920DU40 (both available from AczoNobel).

A content of the thermal foaming agent may be 0.1 mass % or greater, 0.3 mass % or greater, or 0.5 mass % or greater, based on the total mass of the second adhesive composition, from the perspective of increasing space filling properties due to foaming of the second adhesive layer. The content of the thermal foaming agent may be 20 mass % or less, 15 mass % or less, or 10 mass % or less, based on the total mass of the second adhesive composition, from the perspective of suppressing the decrease in adhesivity due to excessive expansion. The content of the thermal foaming agent may be from 0.1 to 20 mass % based on the total mass of the second adhesive composition.

The second adhesive composition preferably further contains a core shell toughening agent. As the core shell toughening agent, those commonly known as core shell rubber modifiers in the art can be used variously. The core shell toughening agent has an inner core and an outer shell usually composed of different materials.

A material for the core is made of, for example, a rubbery polymer having a glass transition temperature of room temperature or lower. Specific examples of the material include acrylic polymers made of butyl acrylate, butadiene polymer, butadiene-styrene copolymers, and silicon rubber, and cross-linked products thereof. A material for the shell is made of, for example, a polymer having a glass transition temperature of room temperature or higher (non-rubbery at room temperature). Specific examples of the material include methyl methacrylate polymers and their copolymers, as well as crosslinked products thereof, modified products with functional groups such as carboxyls, hydroxyls, epoxies, cyanates, aminos, thiols and the like that can react with the epoxy component.

The core shell toughening agent may be a commercially available product, for example, MX217, BTA751, BTA731 (all available from Dow Chemical Co., ltd.), and AC-3355 (available from Aica Kogyo Co., Ltd.).

From the perspective of further improving physical properties of the adhesive, a content of the core shell toughening agent may be 10 mass % or greater, 12 mass % or greater, or 15 mass % or greater, based on the total mass of the second adhesive composition. The content of the core shell toughening agent may be 50 mass % or less, 30 mass % or less, 25 mass % or less, or 20 mass % or less, based on the total mass of the second adhesive composition, from the perspective of favorably obtaining the advantages of the other components contained. From these perspectives, the content of the core shell toughening agent may be from 10 to 50 mass % or from 10 to 30 mass % based on the total mass of the second adhesive composition.

In the second adhesive composition, the total amount of the epoxy resin and the core shell toughening agent may be 40 mass % or greater, or 50 mass % or greater from the perspective of obtaining favorable physical properties, and may be from 80 mass % or less, 75 mass % or less, or 70 mass % or less from the perspective of obtaining favorable effects of the other components in the adhesive, based on the total mass of the second adhesive composition.

The second adhesive composition may further contain components other than the components described above. Examples of the optional components include thermoplastic resins, fillers, flame retardants, impact modifiers, thermal stabilizers, processing aids, lubricants, reinforcing agents, coloring agents, photopolymerization initiators, crosslinking agents, chain transfer agents, and silane coupling agents.

The second adhesive composition may be a light cured product of a precursor composition containing, for example, a foaming agent, an epoxy resin, a thermal curing agent, a (meth)acrylate monomer, a photopolymerization initiator, and optionally a chain transfer agent. The photopolymerization initiator is activated by irradiating the precursor composition with light, and the (meth)acrylate monomer is polymerized to produce a (meth)acrylate polymer. The (meth)acrylate monomers are monomers exemplified as the monomeric unit of the (meth)acrylate polymer.

As the photopolymerization initiator, a cleavage type or a hydrogen withdrawing type is effective. Examples of the cleavage type photopolymerization initiator include benzoethyl ether, diethoxyacetophenone, 2,2-dimethoxy-1,2-diphenylethane-1-one, 2-hydroxy-2-methyl-1-phenylpropan-1-one, 1-hydroxycyclohexyl phenyl ketone, 2-hydroxy-1-{4-[4-(2-hydroxy-2-methyl-propionyl)-benzyl]-phenyl}-2-methyl-propan-1-one, 2-methyl-1-[4-(methylthio)phenyl]-2-morpholinopropan-1-one, 2-benzyl-2-dimethylamino-1-(4-morpholinophenyl)-butanone-1, 2-dimethylamino-2-(4-methylbenzyl)-1-(4-morpholin-4-yl-phenyl)-butan-1-one, bis(2,4,6-trimethylbenzoyl)-phenyl phosphine oxide, and 2,4,6-trimethylbenzoyl-diphenyl-phosphine oxide.

Examples of the hydrogen withdrawing type photopolymerization initiator include benzophenone, 2,4-diethylthioxanthone and the like.

Examples of the chain transfer agent include carbon tetrabromide, a mercapto compound and the like. Examples of the mercapto compound include ethanethiol, butanethiol, dodecanethiol, mercaptoethanol (thioglycol), 3-mercaptopropanol, thioglycerin (mercaptoglycerin), thioglycolic acid (mercaptoacetic acid), 2-mercaptopropionic acid (thiolactic acid), 3-mercaptopropionic acid, α-mercaptoisobutyric acid, methyl mercaptopropionate, ethyl mercaptopropionate, and the like.

The total thickness of the second adhesive layer may be set according to the width of the space (slot) into which the adhesive sheet is inserted. For example, when the width of the slot is 200 μm, the total thickness of the insertable adhesive sheet is a value less than 200 μm. When the total thickness of the adhesive sheet is approximately 150 μm, a gap of 50 μm is created. The total thickness of the second adhesive layer is set taking into account the magnification by foaming, the required adhesive strength, so that the gap is filled by foaming of the second adhesive layer. For example, if the gap is 50 μm, the total thickness of the second adhesive layer is from 20 to 200 μm, and may be from 50 to 150 μm.

The adhesive sheet may further include a layer other than the first adhesive layer and the second adhesive layer. Examples of the layer other than the first adhesive layer and the second adhesive layer include a substrate layer (layer formed of a substrate).

The substrate layer is typically a layer provided as an intermediate layer (layer other than the outermost layers). The substrate constituting the substrate layer preferably has heat resistance to such a degree that it does not degrade at the heating temperature when curing the first adhesive layer and the second adhesive layer. For example, a polyethylene naphthalate (PEN) film is used as the substrate. The substrate may have insulating properties. When the adhesive sheet is used in insulating applications, a substrate having insulating properties is preferably used.

A thickness of the substrate layer is, for example, from 1 to 200 nm, and may be from 2 to 150 nm or from 5 to 100 nm.

The adhesive sheet described above can be used in a method for manufacturing an article, including, for example, disposing an adhesive sheet between first and the second elements, and thermally expanding and curing the adhesive sheet by heating to form a filling portion, and especially suitably used in a case where a space between the two elements (the first element and the second element) is narrow. The reason for this is as follows.

First, since the second adhesive layer of the adhesive sheet has foaming properties, the adhesive sheet can be foamed and expanded when heat curing, while having a thickness that enables insertion at room temperature. Therefore, it is possible to fill the space by disposing the adhesive sheet in the space between the adhered elements and then heating it. In addition, the adhesive sheet is formed of the first adhesive layer having at least one substantially non-tacky surface, and thus can be easily inserted as compared with a case where a known adhesive such as a liquid adhesive or an adhesive sheet with a tacky surface is used. In addition, the adhesive sheet includes the second adhesive layer having less restrictions on various components than the first adhesive layer in addition to the first adhesive layer, and thus is less restricted on development of various characteristics required of the adhesive sheet during or after heating, and can favorably exhibit the characteristics. In particular, the adhesive sheet has a plurality of convex structures on the surface on the side of the outermost layer formed of the first adhesive layer, and thus tends to be able to adhere with an improved shear strength to the adherend after heat curing.

The reason why the improved shear strength is obtained by the plurality of convex structures is not clear, but is inferred as follows. First, in a case where there is a plurality of convex structures on the surface on the side of the outermost layer formed of the first adhesive layer, it is inferred that, after heating, the first adhesive layer and the second adhesive layer are favorably mixed before curing is completed, as compared with a case where the outermost layer formed of the first adhesive layer is flat. As described above, the first adhesive layer and the second adhesive layer are different in restriction on the selection of various components, and the adhesivity after heat curing of the second adhesive layer tends to be higher than the adhesion force after heat curing of the first adhesive layer. Therefore, it is inferred that, by mixing the first adhesive layer and the second adhesive layer, high adhesivity derived from the second adhesive layer is likely to be exhibited, and, as a result, that improved shear strength can be obtained.

In one example, the first element is a rotor core of an EV motor (e.g., an IPM motor), and the second element is a magnet. In this example, one surface of the adhesive sheet has tackiness. For example, one outermost layer of the adhesive sheet is formed of the second adhesive layer. In this example, first, the adhesive sheet is attached to the magnet from a surface opposite to the surface having a plurality of convex structures, and a laminate of the magnet and the adhesive sheet (article provided with the adhesive sheet) is formed. The laminate is then inserted into a slot of the rotor core to dispose the adhesive sheet between the rotor core (first element) and the magnet (second element).

In other examples, the first element is a stator of the EV motor and the second element is a coil. In this example, the adhesive sheet has surfaces, both of which have a plurality of convex structures (surfaces of outermost layers formed of the first adhesive layer), and includes a substrate layer having insulating properties in addition to the first adhesive layer and the second adhesive layer. In this example, inserting the adhesive sheet into a slot of the stator disposes the adhesive sheet between the stator (first element) and the coil (second element).

Heating conditions for the adhesive sheet are adjusted as appropriate, from the perspectives of heat foaming the second adhesive layer, as well as of heat curing the first adhesive layer and the second adhesive layer. A heating temperature is preferably from 150 to 200° C., and a heating time is, for example, from 1 to 30 hours.

According to the above method, there is provided an article including a first element, a second element, a filling portion that fills a space between the first element and the second element.

Hereinafter, the adhesive sheet of the present disclosure will be described in more detail with reference to the accompanying drawings. In the description of the drawings, the same or equivalent elements are denoted by the same reference signs, and redundant description of such elements will be omitted. An XYZ rectangular coordinate system is illustrated in the drawings as necessary.

Figure 2:
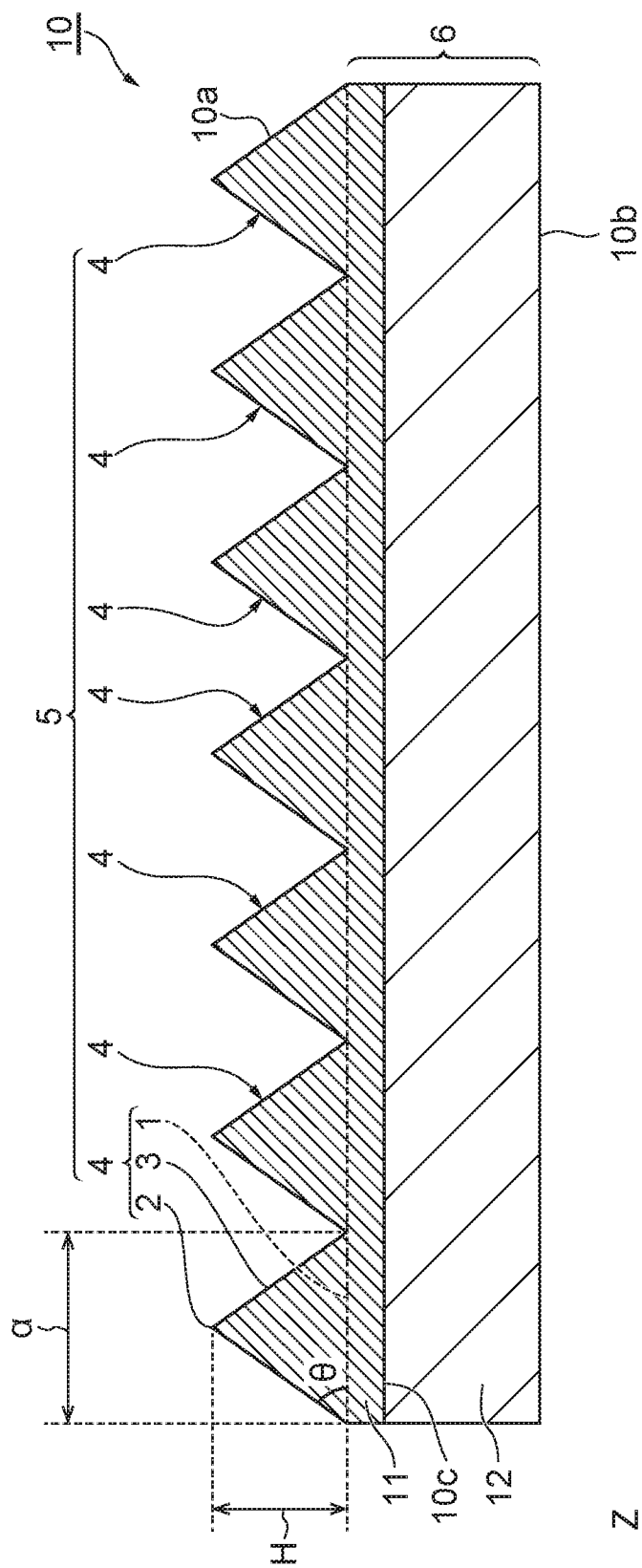
FIG. 2 is a cross-sectional view taken along line II-II of FIG. 1.
Figure 3A:
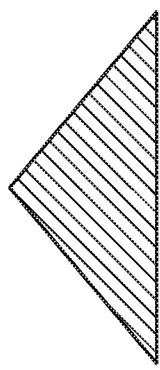
FIG. 3 is a cross-sectional view illustrating examples of a convex structure.
Figure 3B:
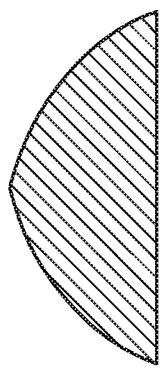
Figure 3C:
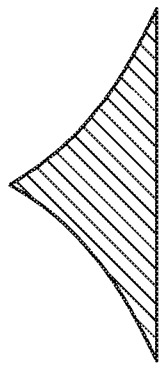
Figure 3D:
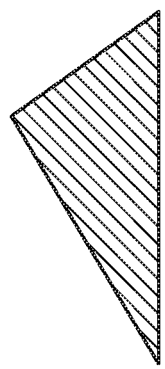
Figure 3E:
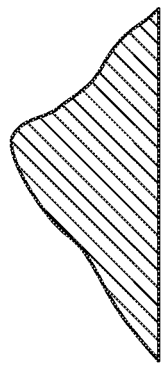
Figure 3F:
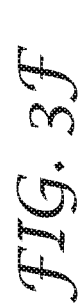
Figure 4A:
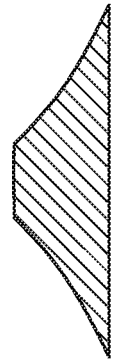
FIG. 4 is a cross-sectional view illustrating examples of the convex structure.
Figure 4B:
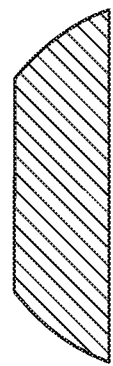
Figure 4C:
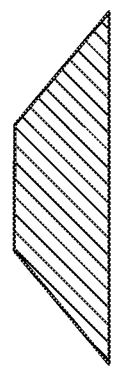
Figure 4D:
Figure 4E:
Figure 4F:
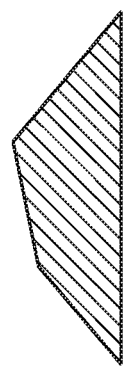

FIG. 1 is a perspective view of an adhesive sheet according to an embodiment. FIG. 2 is a cross-sectional view taken along line II-II of FIG. 1. An adhesive sheet 10 illustrated in FIGS. 1 and 2 includes a surface 10a and a surface 10b. The surface 10a is a surface on a first outermost layer 11 side, and the surface 10b is a surface on a second outermost layer 12 side. The surface 10a and the surface 10b extend along a plane (e.g., an XY plane) orthogonal to a thickness direction (e.g., Z-axis direction) of the adhesive sheet 10.

The adhesive sheet 10 has a fine structure 5 on the surface 10a and does not have the fine structure 5 on the surface 10b. The fine structure 5 includes a plurality of convex structures 4 (convex bodies). Herein, the "convex structure" generally refers to a solid figure that includes any plane figure as a bottom surface, and that is constituted by connecting all points in a side of the bottom surface and all points in a side of any other plane figure or a line (top) that is not planar on the bottom surface. Preferably, the area of the top of the convex structure is smaller than the area of the bottom surface. More preferably, the convex structure is shaped to be tapered from the bottom surface toward the top.

Preferably, the plurality of convex structures 4 may be arrayed regularly or may be arrayed randomly on a plane. The plurality of convex structures 4 are arrayed in a lattice shape along the X-axis direction and the Y-axis direction in the surface 10a, in the example of FIGS. 1 and 2.

Each convex structure 4 includes the bottom surface 1, a top 2, and a plurality of side surfaces 3 connecting edges of the bottom surface 1 and the top 2. The bottom surface 1 has any plane figure such as a circle (including an ellipse) or a polygonal shape (a triangle, a square or a hexagon). In the example of FIGS. 1 and 2, the convex structure 4 is a quadrangular pyramid-shaped cone structure, and the bottom surface 1 has a square shape.

In the example of FIGS. 1 and 2, the convex structure 4 is a cone structure, but the convex structure 4 may be a frustum structure or rib structure. As the convex structure 4, two or more of the cone structure, the frustum structure, and the rib structure may coexist.

FIGS. 3 and 4 are each a cross-sectional view illustrating an example of the convex structure 4. FIG. 3 is a cross-sectional view when the convex structure 4 is a cone structure or rib structure, and FIG. 4 is a cross-sectional view when the convex structure 4 is a frustum structure or rib structure. A cross section of the convex structure 4 may have a triangle shape as illustrated in FIG. 3(a), may have distorted side surfaces as illustrated in FIG. 3(b) to FIG. 3(d), may have a shape in which the position of the apex is deviated from the center of the bottom surface as illustrated in FIG. 3(e), or may have a distorted side surface and a shape in which the position of the apex is deviated from the center of the bottom surface as illustrated in FIG. 3(f). A cross section of the convex structure 4 may have a trapezoidal shape as illustrated in FIG. 4(a), may have distorted side surfaces as illustrated in FIG. 4(b) to (c), may have a distorted top surface as illustrated in FIG. 4(d) to FIG. 4(e), or may have distorted side surfaces and a distorted top surface as illustrated in FIG. 4(f). Additionally, the top surface of the convex structure 4 may not be parallel to the bottom surface, or may not be a flat surface. When the convex structure 4 is a cone structure or a frustum structure, the cross sections passing through the apex of the convex structure 4 (the apex of the cone structure or the apex of the frustum corresponding to the frustum structure) are not necessarily all the same shape, and may have different shapes.

The area of each of the convex structures 4 projected to a surface orthogonal to a height direction of the convex structure 4 (area of a bottom surface 1 of the convex structure 4) may be 10 square micrometers or greater and may be 10000 square micrometers or less.

The width (a in FIG. 2) of the bottom surface 1 of the convex structure 4 in an array direction (the X-axis direction, for example) of the convex structures 4 may be 2 mm or less, 1 mm or less, 500 µm or less, 300 µm or less, 100 µm or less, or 50 µm or less.

The height of the convex structure 4 (H in FIG. 2) may be set in accordance with the width of the space (slot) for inserting the adhesive sheet. From the perspective of reducing the coefficient of dynamic friction of the surface, it may be 2 µm or greater, 5 µm or greater, or 10 µm or greater. The height of the convex structure 4 may be 200 µm or less, 100 µm or less, 75 µm or less, and 50 µm or less or 25 µm or less, from the perspective of facilitating mixing of the second adhesive layer and the first adhesive layer when the second adhesive layer is foamed. From these perspectives, the height of the convex structure 4 may be from 2 to 200 µm. Note that the height of the convex structure 4 is based on the normal direction (the Z-axis direction) of the bottom surface 1 of the convex structure 4.

The side shape of the convex structure 4 may be various shapes. An angle θ formed by the side surface 3 and the bottom surface 1 is more than 0° and less than 180° in the cross-sectional (XZ plane) including the apex of the convex structure 4 and the array direction of the convex structure 4, and may be 5° or greater, 10° or greater, 150 or greater, 200 or greater, 250 or greater, or 300 or greater, and may be less than 90°, 850 or less, 80° or less, or 700 or less.

The shapes of the plurality of convex structures 4 may be different or the same. The plurality of convex structures 4 preferably have substantially the same height (for example, a difference is within ±5%, ±3%, or ±1%), and more preferably, all of the convex structures 4 have substantially the same shape. In a case where the convex structures 4 have different shapes, the fine structure 5 preferably includes 10 or less, 9 or less, 8 or less, 7 or less, 6 or less, 5 or less, 4 or less, 3 or less, or 2 or less types of convex structures.

A center-to-center distance between the two adjacent convex structures 4 may be 10 µm or greater, 20 µm or greater, or 30 µm or greater, from the perspective of facilitating the mixing of the second adhesive layer and the first adhesive layer with the foaming and expansion of the second adhesive layer, and may be 2 mm or less, 1 mm or less, 500 µm or less, 300 µm or less, or 200 µm or less, from the perspective of keeping the coefficient of dynamic friction of the surface low at room temperature. Note that the center of the convex structure 4 means the apex of the convex structure 4 (e.g., the apex of the cone structure or the apex of the frustum corresponding to the frustum structure). The center-to-center distance between the two adjacent convex structures 4 corresponds to a sum ($\alpha+\beta$) of a width a of the bottom surface 1 of the convex structure 4 and an interval $\beta$ between the bottom surface 1 of the adjacent convex structure 4. In the example illustrated in FIG. 2, the interval $\beta$ is 0.

From the perspective of attaining both high adhesiveness and a low coefficient of dynamic friction, the number of the convex structures 4 is preferably 25 or greater, 36 or greater, 49 or greater, 64 or greater, 81 or greater, or 100 or greater per cm$^2$ of a surface of the adhesive sheet 10. The number of the convex structures 4 corresponds to the number of the centers of the convex structures 4 present in the unit area. The number of the convex structures 4 is preferably 1000 or less in terms of manufacturing stability.

The adhesive sheet 10 may include a base 6 in a portion below the plurality of convex structures 4. The base 6 is joined or continuous with the bottom surfaces 1 of the convex structures 4 of the fine structure 5. A thickness of the base 6 can arbitrarily be set according to a desired thickness of the adhesive sheet 10.

The adhesive sheet 10 includes one outermost layer (first outermost layer 11) formed of the first adhesive layer and the other outermost layer (second outermost layer 12) formed of the second adhesive layer. The first outermost layer 11 is a molded body of the first adhesive composition, and constitutes a portion of the entire convex structures 4 and a portion of the base 6. The second outermost layer 12 constitutes the other part of the base 6.

A thickness of the first outermost layer 11 (first adhesive layer) may be 1 µm or greater, 2.5 µm or greater, 5 µm or greater, or 10 µm or greater, and may be 200 µm or less, 100 µm or less, or 50 µm or less, and may be from 1 to 200 µm, from 2.5 to 100 µm, from 5 to 50 µm, or from 10 to 50 µm. The thickness of the first outermost layer 11 means a distance between the highest part of the convex structure 4 and the surface (surface overlapping with an interface 10c) opposite to the surface 10a, based on the normal direction (Z-axis direction) of the bottom surface 1 of the convex structure 4.

A thickness of the second outermost layer 12 (second adhesive layer) may be 10 µm or greater, 25 µm or greater, or 50 µm or greater, and may be 200 µm or less, or 150 µm or less, and may be from 10 to 200 µm, from 25 to 150 µm, or from 50 to 150 µm.

The thickness of the adhesive sheet 10 may be set according to the width of the space (slot) for inserting the adhesive sheet. That is, it can be arbitrarily set depending on the width of the space (slot) for inserting the adhesive sheet, the gap to be filled, the foaming proportion, the required adhesive strength, and the like. The thickness of the adhesive sheet 10 may be, for example, from 15 µm to 1 mm, and may also be from 50 µm to 300 µm. The thickness of the adhesive sheet 10 means a distance between the highest part of the convex structure 4 and the surface 10b opposite to the surface 10a provided with the fine structure 5, based on the normal direction of the bottom surface 1 of the convex structure 4.

The coefficient of dynamic friction of the surface 10a having the fine structure 5 of the adhesive sheet 10 is, for example, 0.8 pd or less (e.g., from 0 to 0.8 pd), and can be 0.5 pd or less by changing the composition of the first adhesive layer, the shape and arrangement of the convex structures 4, and the like. Note that the coefficient of dynamic friction is a value measured in accordance with JIS K7125 "Plastics and Films—Determination of the coefficients of friction".

Figure 5A:
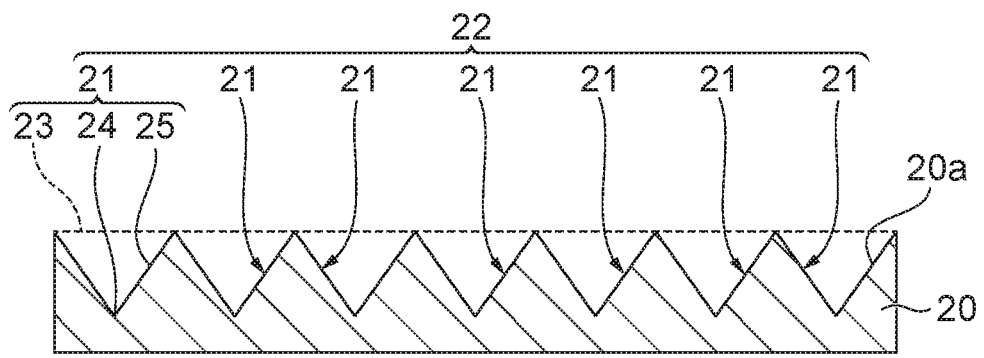
FIG. 5 is a cross-sectional view for describing a method for manufacturing the adhesive sheet of FIG. 1.
Figure 5B:
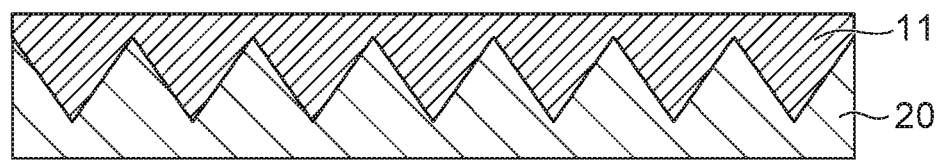
Figure 5C:
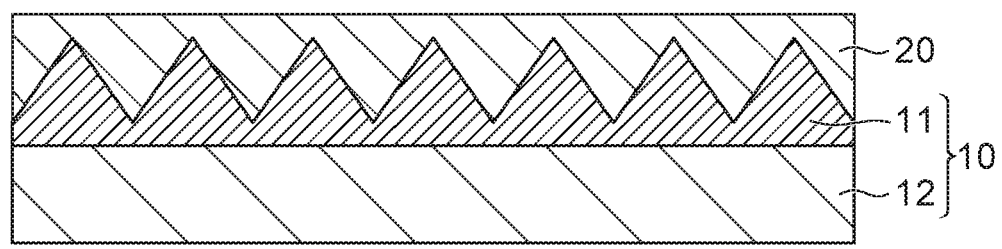

FIG. 5 is a cross-sectional view for describing an example of a method for manufacturing the adhesive sheet 10. The method for manufacturing the adhesive sheet 10 includes, for example, preparing a mold 20 having a plurality of concave structures 21 (concave bodies) on a surface 20a (FIG. 5(a)); applying, to the surface 20a of the mold 20, a solution containing an epoxy resin having a softening point of 50° C. or higher and a thermal curing agent (a solution of a first adhesive composition), solidifying it, and molding a first adhesive layer (first outermost layer 11) (FIG. 5(b)); and providing a second adhesive layer (second outermost layer 12) on a side of the first adhesive layer (first outermost layer 11) opposite to the mold 20 (FIG. 5(c)).

The mold 20 has a fine structure 22 that includes a plurality of concave structures 21 on the surface 20a. Each concave structure 21 includes a top surface 23, a bottom portion 24, and a plurality of side surfaces 25 connecting between an edge of the top surface 23 and the bottom portion 24. The top surface 23 is a virtual plane corresponding to the surface 20a when the concave structure 21 is not present on the surface 20a. The fine structure 22 substantially corresponds to the fine structure 5 of the adhesive sheet. That is, the convex structure 4 of the adhesive sheet 10 and the concave structure 21 of the mold 20 have substantially the same shape and are disposed in substantially the same array. The mold 20 can be made by machining a flat plate made of a material such as a metal or a resin by using a diamond cutter, a laser or the like. A difference between the size of the convex structure 4 and the size of the concave structure 21 is preferably within ±5%, within ±3%, or within ±1%.

Examples of a method of applying the solution include methods such as a hand coat and a die coat. The solution may contain the components described above that may be contained in the first adhesive composition in addition to the epoxy resin and the thermal curing agent. The solution may contain a solvent. The solvent is not particularly limited as long as it can dissolve the components that can be contained in the first adhesive composition, and examples thereof include methyl ethyl ketone, ethyl acetate, and methyl isobutyl ketone. The solidification of the solution may be performed, for example, by heating the solution. The heating conditions may be appropriately set depending on the type of solvent in the solution or the like.

The step of providing the second adhesive layer (second outermost layer 12) may be, for example, a step of providing a layer formed of a precursor composition of the second adhesive composition on the first adhesive layer (first outermost layer 11) and then photocuring the precursor composition. The layer formed of the precursor composition may be formed on the first adhesive layer, or may be provided by forming a layer formed of the precursor composition in advance and then attaching the layer to the first adhesive layer. The layer formed of the precursor composition can be obtained, for example, by applying a solution containing the constituent components of the precursor composition onto the first adhesive layer or a peeling substrate, and then solidifying the solution by heating or the like.

Figure 6:
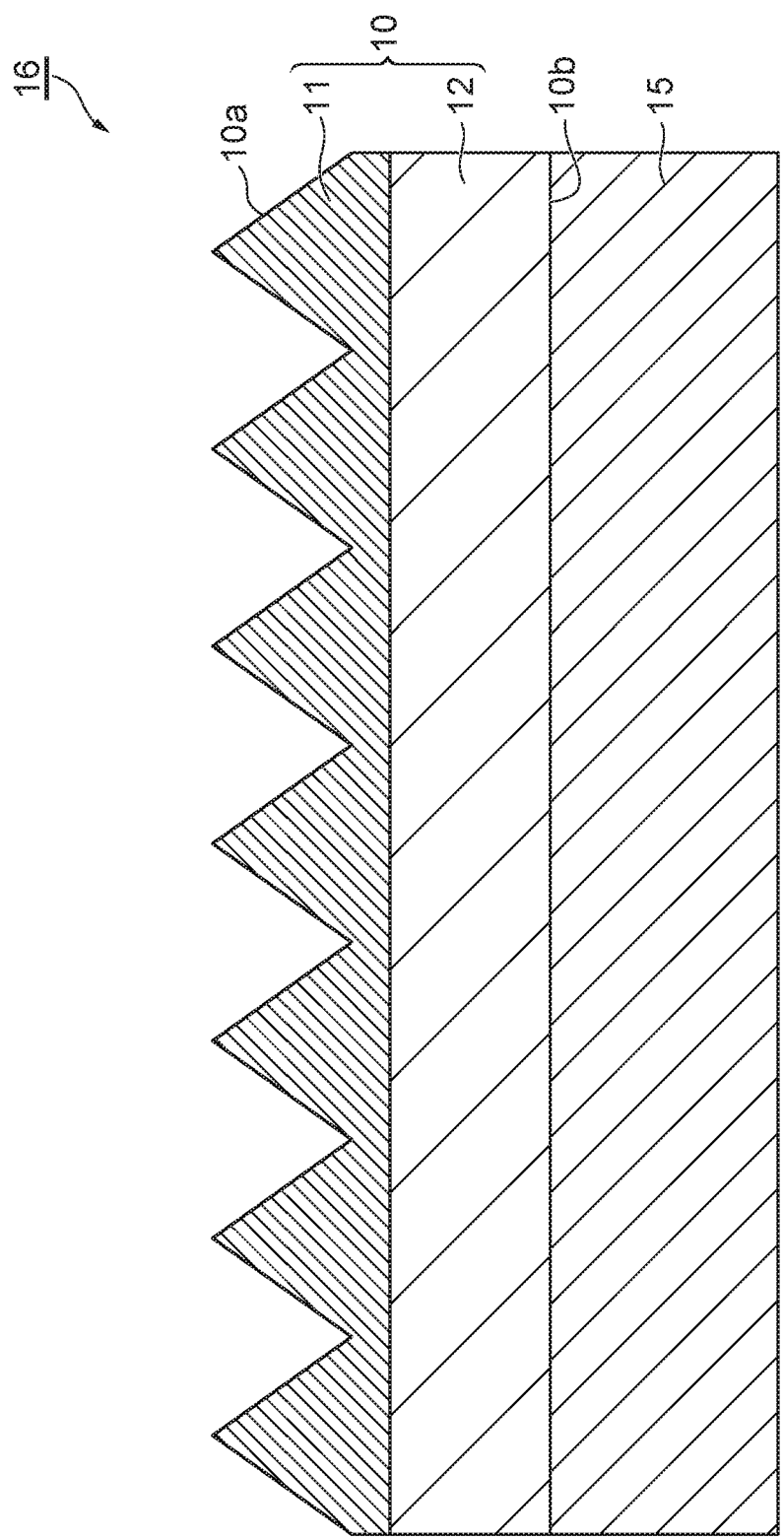
FIG. 6 is a cross-sectional view illustrating an article including the adhesive sheet of FIG. 1.

As illustrated in FIG. 6, for example, the adhesive sheet 10 described above is used by attaching the surface 10b (surface on the second adhesive layer side) of the adhesive sheet 10 to the adherend 15. That is, an embodiment of the present disclosure provides an article 16 including the adhesive sheet 10 and the adherend 15 to which the adhesive sheet 10 is attached. An example of the adherend 15 is a magnet to be inserted into a slot of a rotor core of an IPM (Interior Permanent Magnet) motor.

The adhesive sheet of the present disclosure has been described in detail above using the adhesive sheet 10 according to an embodiment as an example. However, the adhesive sheet of the present disclosure is not limited to the above-described embodiment. Hereinafter, other embodiments of the adhesive sheet of the present disclosure will be described. Note that, in the following description, descriptions about the contents that overlap with the above-described embodiment are omitted.

Figure 7:
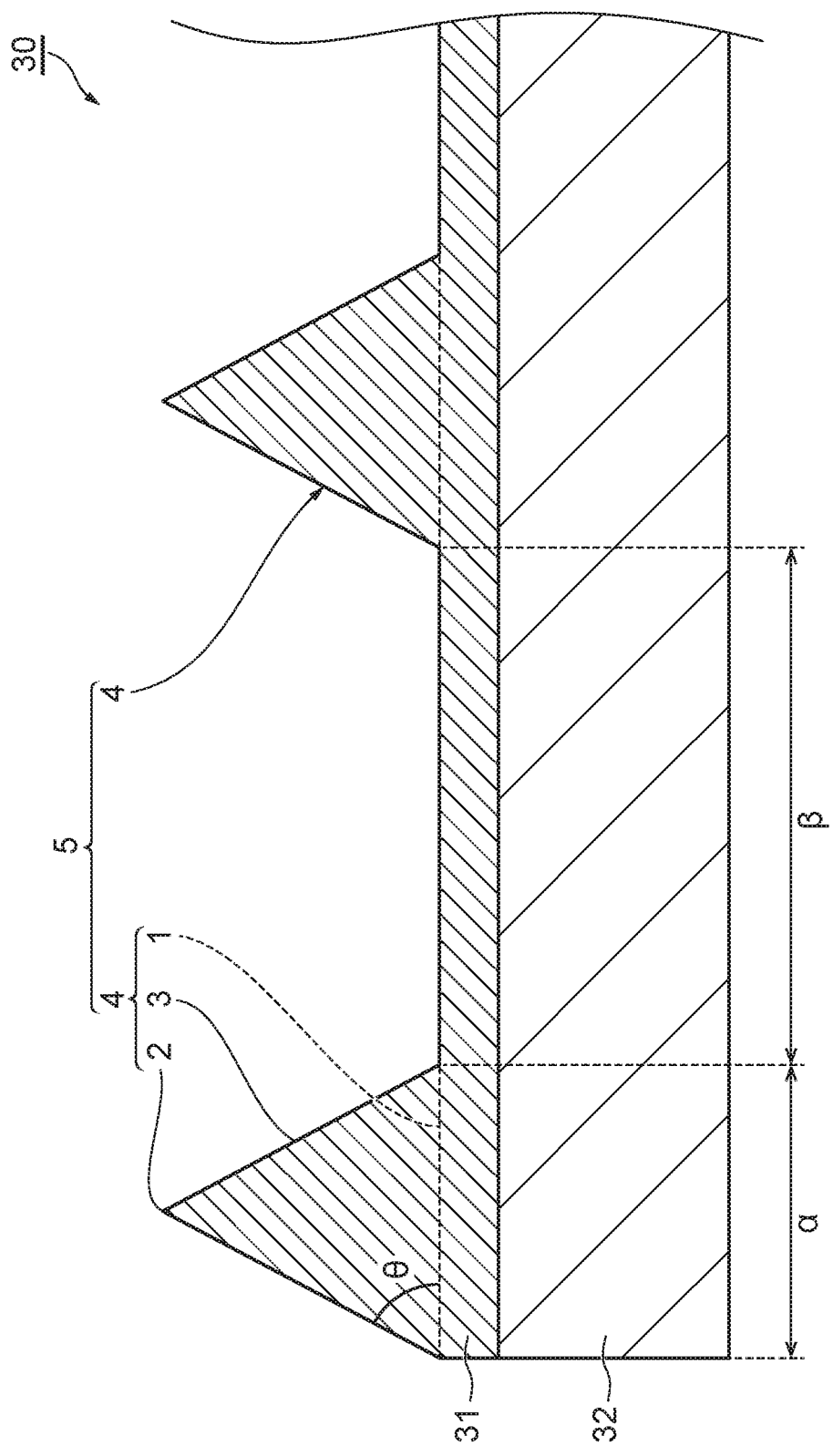
FIG. 7 is a cross-sectional view illustrating an adhesive sheet according to another embodiment.

FIG. 7 is a cross-sectional view of an adhesive sheet according to another embodiment. An adhesive sheet 30 illustrated in FIG. 7 includes a first outermost layer 31 formed of a first adhesive layer and a second outermost layer 32 formed of a second adhesive layer. In the example of FIGS. 1 and 2, the two adjacent convex structures 4 are in close proximity, sharing one side of the bottom surface 1. However, a plurality of convex structures 4 of the adhesive sheet 30 are arrayed at intervals p of more than 0 between bottom surfaces 1 of the adjacent convex structures 4. Each interval β is 0 μm or greater, and may be 1 μm or greater. The interval β may be 100 μm or less, 50 μm or less, 15 μm or less, or 10 μm or less.

Figure 8:
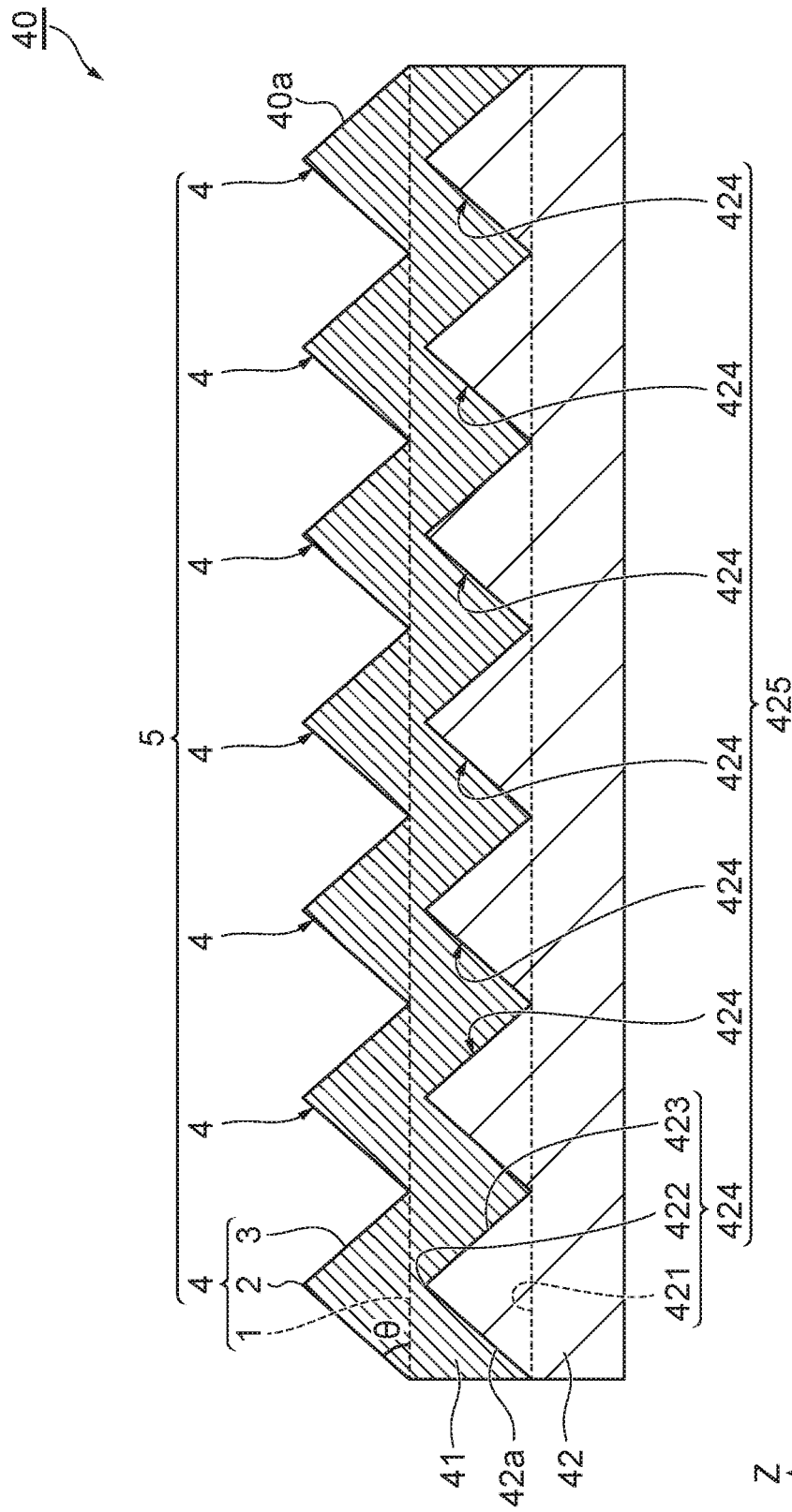
FIG. 8 is a cross-sectional view illustrating an adhesive sheet according to another embodiment.

FIG. 8 is a cross-sectional view of an adhesive sheet according to another embodiment. In an adhesive sheet 40 illustrated in FIG. 8, a first outermost layer 41 formed of the first adhesive layer is made of a deposit of a powdery first adhesive composition, and a second outermost layer 42 adjacent to the first outermost layer 41 includes a fine structure 425 including a plurality of convex structures 424 on a surface 42a in contact with the first outermost layer 41. The plurality of convex structures 424 have a bottom surface 421, a top 422, and a plurality of side surfaces 423 connecting between an edge of the bottom surface 421 and the top 422. The first outermost layer 41 is formed by depositing a powdery first adhesive composition on the surface 42a, and thus has a structure that follows the fine structure 425. That is, the fine structure 5 of the surface 40a of the adhesive sheet 40 has a structure that follows the fine structure 425. Note that when the adhesive sheet 40 includes an intermediate layer, the intermediate layer adjacent to the first outermost layer 41 may have the fine structure described above.

In the above embodiment where the first outermost layer formed of the first adhesive layer is made of a deposit of the powdery first adhesive composition, the advantage is obtained that the use of a solvent and the drying time therefor in formation of the first outermost layer can be unnecessary, as compared with an embodiment in which the first outermost layer is made of a molded body of the first adhesive composition. On the other hand, in the embodiment in which the first outermost layer formed of the first adhesive layer is made of a molded body of the first adhesive composition, the advantage is obtained that the first outermost layer is more stably affixed to the adjacent layer, as compared with the above embodiment in which the first outermost layer is made of a deposit of the powdery first adhesive composition.

Figure 9A:
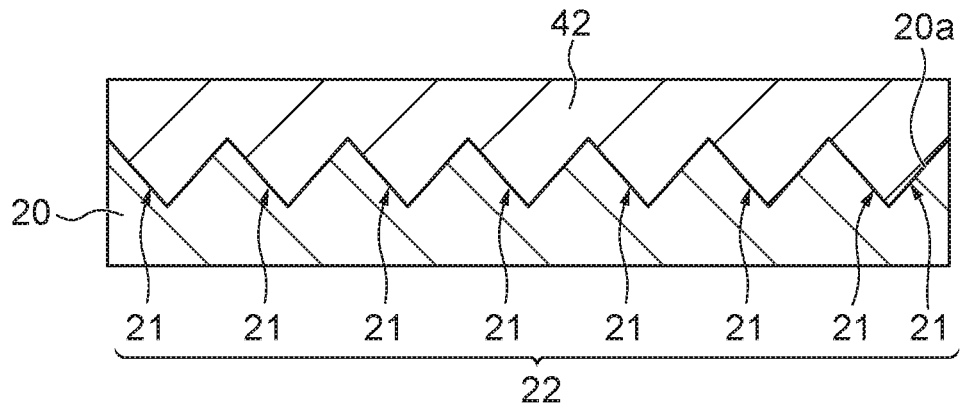
FIG. 9 is a cross-sectional view for describing a method for manufacturing the adhesive sheet in FIG. 8.
Figure 9B:
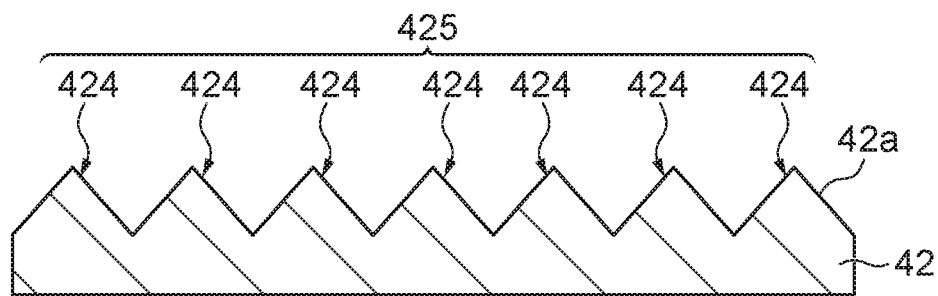
Figure 9C:
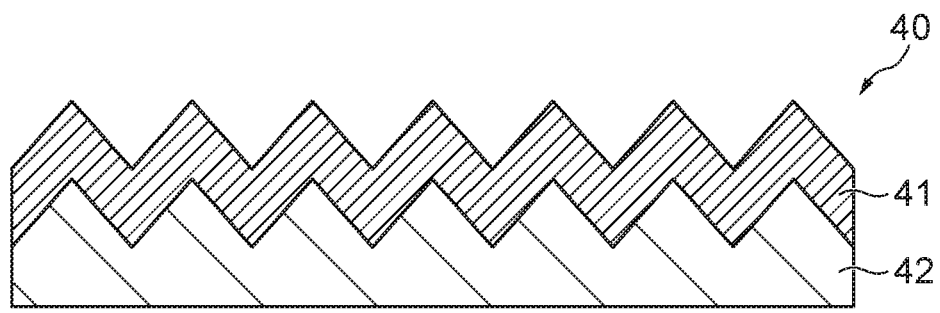

FIG. 9 is a cross-sectional view illustrating an example of the method for manufacturing the adhesive sheet 40 according to the embodiment described above. The method for manufacturing the adhesive sheet 40 includes, for example, forming a second adhesive layer (second outermost layer 42) on a surface 20a of a mold 20 having a plurality of concave structures 21 on the surface 20a, and thus forming a plurality of convex structures 424 on a surface 42a of the second adhesive layer (second outermost layer 42) (FIG. 9(a) and FIG. 9(b)); and depositing a powdery first adhesive composition on the surface 42a of the second adhesive layer (second outermost layer 42) (FIG. 9(c)). Details of the mold 20 are similar to those in the above embodiment, and thus are omitted.

The second adhesive layer (second outermost layer 42) may be formed, for example, by providing a layer formed of a precursor composition of the second adhesive composition on the surface 20a of the mold 20, and then photocuring the precursor composition. The layer formed of the precursor composition may be formed on the surface 20a of the mold 20, or may be provided by forming a layer formed of the precursor composition in advance, and then attaching the layer to the mold 20. This forms the fine structure 425 on the surface 42a of the second adhesive layer (second outermost layer 42). The fine structure 425 includes the convex structures 424 having a shape substantially the same as the concave structures 21 of the mold 20 in substantially the same array as the mold 20.

In the present embodiment, the first adhesive composition can be deposited on the surface 42a by sprinkling the first adhesive composition on the surface 42a of the second adhesive layer (second outermost layer 42). The first adhesive composition includes, for example, a particulate epoxy resin having an average particle size from 1 to 100 μm as the epoxy resin having a softening point of 50° C. or higher. The larger the average particle size of the epoxy resin, the larger the distance between the adherend and the second adhesive layer. When the average particle size is small, the center-to-center distance between the particles can be reduced. Within the above range, they tend to be balanced. The average particle size of the epoxy resin is a value measured by laser diffraction.

FIG. 10 is a cross-sectional view of an adhesive sheet according to another embodiment. An adhesive sheet 50 illustrated in FIG. 10(a) includes a first outermost layer 51 formed of a first adhesive layer and a second outermost layer 52 formed of a second adhesive layer. An adhesive sheet 60 illustrated in FIG. 10(b) includes a first outermost layer 61 formed of a first adhesive layer and a second outermost layer 62 formed of a second adhesive layer. In the examples illustrated in FIGS. 2 and 8, each of the convex structure is entirely composed of the first adhesive layer, but, in the adhesive sheets 50 and 60 illustrated in FIG. 10(a) and FIG. 10(b), the convex structure 4 is only partially (a portion including the top 2 of the convex structure 4) composed of the first adhesive layer (first outermost layer 51 or 61). The first outermost layer 51 (first adhesive layer) illustrated in FIG. 10(a) can be obtained by molding the first adhesive composition in the same manner as the first outermost layer 11 (first adhesive layer) of the adhesive sheet 10 illustrated in FIG. 2. The first outermost layer 61 (first adhesive layer) illustrated in FIG. 10(b) is obtained by depositing the powdery first adhesive composition in the same manner as the first outermost layer 41 (first adhesive layer) of the adhesive sheet 40 illustrated in FIG. 8. Note that in the adhesive sheet illustrated in FIG. 10(a), the first outermost layer 51 is partially present in a discontinuous manner on the adjacent second outermost layer 52, but the structure having such a shape is also included in the "layer". That is, the term "layer" in the present specification encompasses, in addition to a structure having a shape of being continuously formed on the entire surface, a structure having a shape of being partially formed in a discontinuous manner, when viewed as a plan view.

Figure 11:
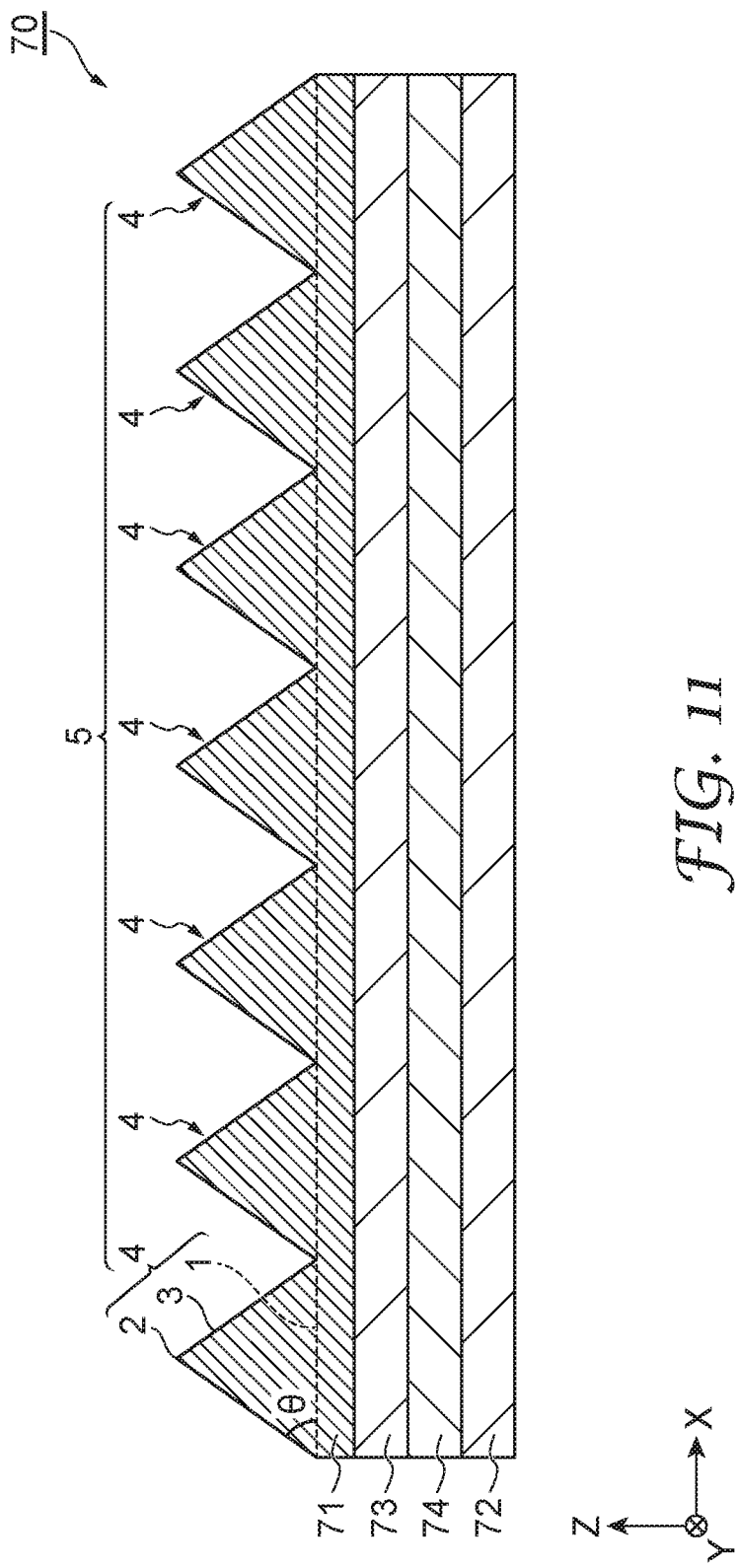
FIG. 11 is a cross-sectional view illustrating an adhesive sheet according to another embodiment.

FIG. 11 is a cross-sectional view of an adhesive sheet according to another embodiment. An adhesive sheet 70 illustrated in FIG. 11 includes an intermediate layer in addition to first and second outermost layers 71 and 72. The intermediate layer includes a first intermediate layer 73 and a second intermediate layer 74. The first intermediate layer 73 is a layer adjacent to the first outermost layer 71, and is, for example, a second adhesive layer. The second intermediate layer 74 is a layer adjacent the second outermost layer 72, and is, for example, a substrate layer as described above.

Figure 12:
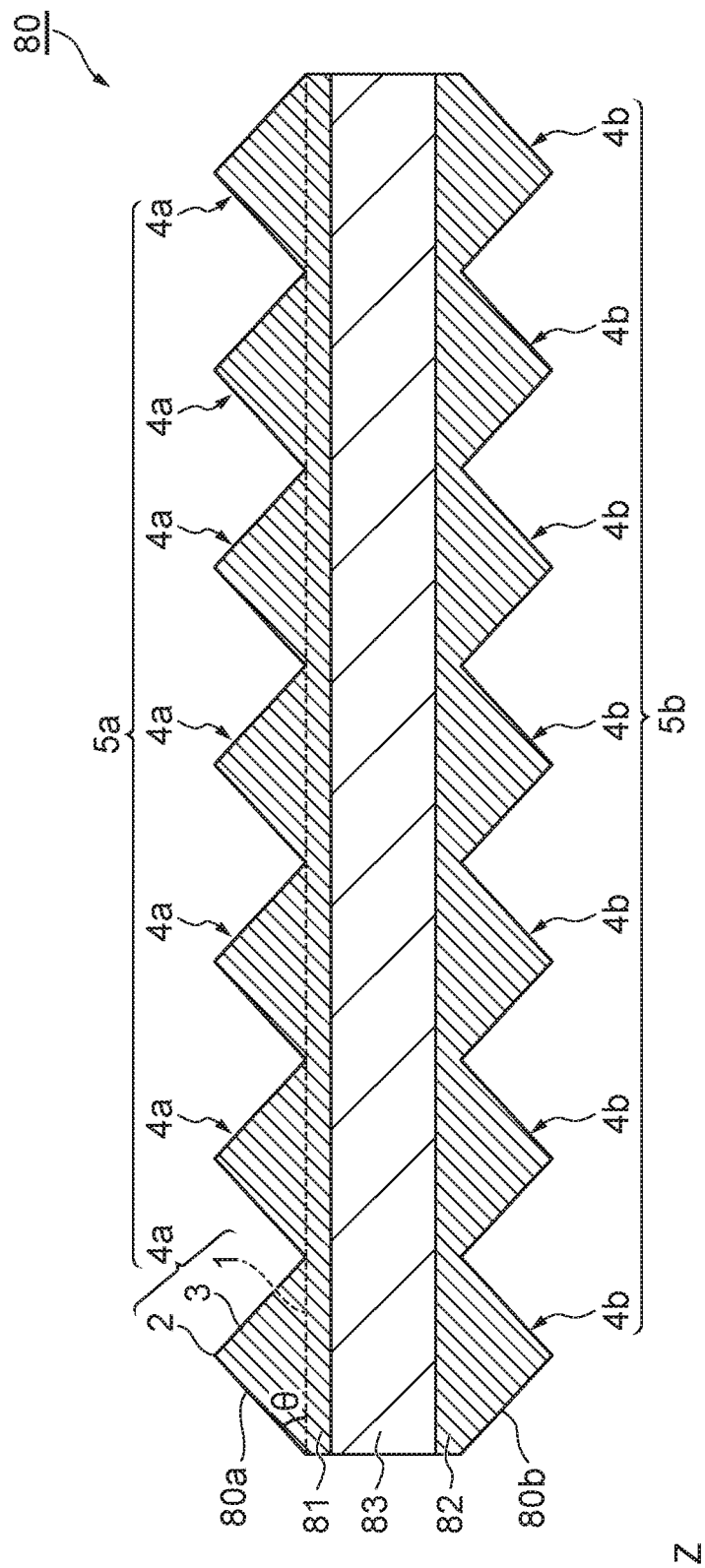
FIG. 12 is a cross-sectional view illustrating an adhesive sheet according to another embodiment.

FIG. 12 is a cross-sectional view of an adhesive sheet according to another embodiment. An adhesive sheet 80 illustrated in FIG. 12 includes outermost layers (first outermost layer 81 and second outermost layer 82) both of which are formed of a first adhesive layer, and fine structures 5a and 5b are provided on the surfaces 80a and 80b, respectively. Details of the fine structure 5a and 5b (including details of the convex structures 4a and 4b) are the same as the fine structures 5 of the adhesive sheet 10 described above. The fine structure 5a on one surface 80a side may be the same as or different from the fine structure 5b on the other surface 80b side.

An intermediate layer 83 of the adhesive sheet 80 includes a second adhesive layer. The intermediate layer 83 preferably includes, in addition to the second adhesive layer, a substrate layer as described above (e.g., a layer formed of an insulating substrate). The adhesive sheet 80 may have a structure in which the first adhesive layer, the second adhesive layer, the substrate layer, the second adhesive layer, and the first adhesive layer are laminated in this order, for example. The adhesive sheet 80 like this can be suitably used for adhering the stator of the EV motor and the coil.

EXAMPLES

Hereinafter, the contents of the present disclosure will be described in more detail with reference to Experimental Examples which will be described below, but the present disclosure is not intended to be limited to these Experimental Examples.

<Preparation of Material>

The following materials were prepared.

TABLE 1

| Product name | Details |
|---|---|
| NPPN442 | Trifunctional epoxy resin, available from Nan Ya, Taiwan |
| FA-513M | Dicyclopentanyl methacrylate, available from Hitachi Chemical Company, Ltd. |
| GMA | Glycidyl methacrylate, available from Kyoeisha Chemical Co., Ltd. |
| MX-217 | Core shell impact modifier (toughening agent), available from Dow Chemical Japan Ltd. |
| EML-101 | Thermally expandable microspheres, available from Sekisui Chemical Co., Ltd. average particle size: from 12 to 18 μm, thermal expansion temperature: from 115 to 130° C. |
| 2MZA-PW | Imidazole, Shikoku Chemicals Corporation |
| DICY1200F | Dicyandiamide, available from Evonik Japan |
| Irgacure 651 | 2,2-Dimethoxy-1,2-diphenylethane-1-one; Ciba Specialty Chemical Co, Ltd. |
| Irganox1010 | 3-(3',5'-di-t-butyl-4'-hydroxyphenyl)propionate, available from BASF |
| $CBr_4$ | Chain transfer agent, available from FUJIFILM Wako Pure Chemical Corporation |
| Scotchkote ™ 206N | Fusion-bonded epoxy coating resin (mixture containing epoxy resin particles with an average particle size of 50 μm (4,4'-isopropylidenediphenol-epepichlorohydrin polymer, softening point: ≥50° C.), curing agent (dicyandiamide), calcium silicate, titanium oxide, and fused quartz), available from 3M |
| PET nonwoven fabric | thickness: 30 μm, fiber size: from 7 to 12 μm, available from Daio Paper Corporation |
| Mold 1 | Sheet with fine structure illustrated in FIG. 13 on surface, available from 3M |
| Mold 2 | Sheet with fine structure illustrated in FIG. 14 on surface, available from 3M |

Figure 13B:
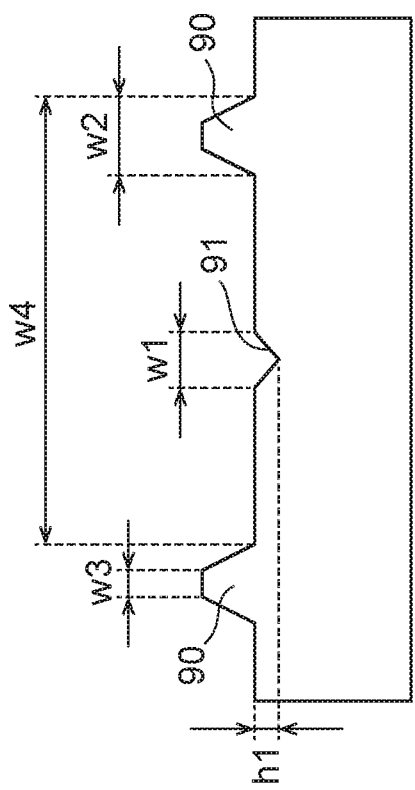
FIG. 13 is a diagram illustrating a mold (sheet) used in Examples.
Figure 13A:
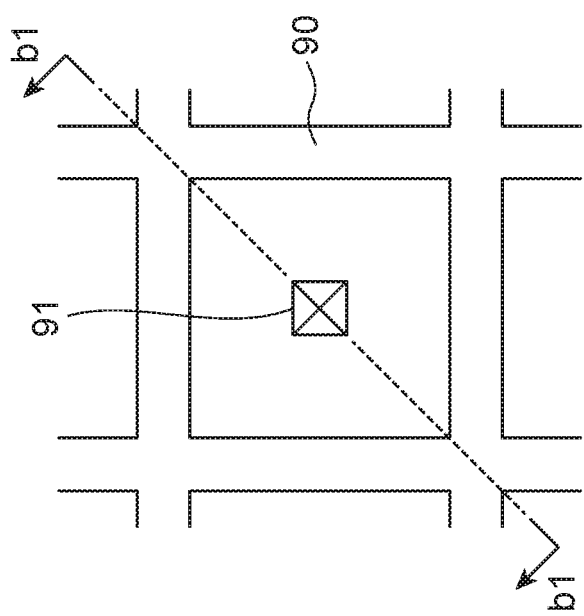

FIG. 13(a) is a plan enlarged view of the mold 1, and (b) is a cross-sectional view taken along line b1-b1 of FIG. 13(a). As illustrated in FIGS. 13(a) and 13(b), a protrusion 90 is formed in a lattice shape on a surface of the mold 1, and a regular quadrangular pyramid-shaped recess 91 is formed at a center of each square surrounded by the protrusions 90. A depth of the recess 91 (corresponding to h1 in FIG. 13(b)) is 10 μm, an opening width of the recess 91 (corresponding to w1 in FIG. 13(b)) is 38 μm, a lower bottom width of the protrusion 90 (corresponding to w2 in FIG. 13(b)) is 20 μm, an upper bottom width of the protrusion 90 (corresponding to w3 in FIG. 13(b)) is 3 μm, and a pitch between the adjacent protrusions (corresponding to w4 in FIG. 13(b)) is 197 μm.

Figure 14B:
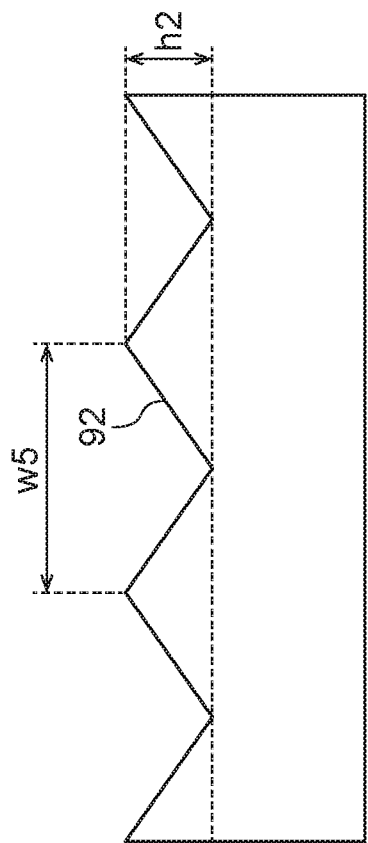
FIG. 14 is a diagram illustrating a mold (sheet) used in the Examples.
Figure 14A:
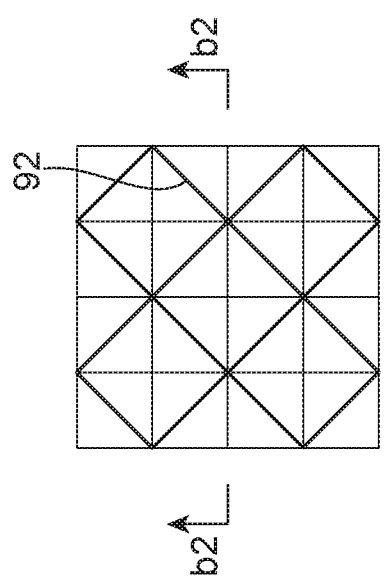

FIG. 14(a) is a plan enlarged view of the mold 2, and FIG. 14(b) is a cross-sectional view taken along line b2-b2 of FIG. 14(a). As illustrated in FIGS. 14(a) and 14(b), a regular quadrangular pyramid-shaped recess 92 is formed and aligned in a lattice shape on a surface of the mold 2. A depth of the recess 92 (corresponding to h2 in FIG. 14(b)) is 13 μm, and an opening width between the adjacent recesses 92 (corresponding to w5 in FIG. 14(b)) is 197 μm.

Experimental Example 1

The materials shown in Table 2 were mixed with MEK (methyl ethyl ketone) at the blending proportions shown in Table 2 to obtain a mixed liquid (solid content: 50 mass %). The obtained mixed liquid was applied onto a substrate film (PET film) and dried to form a coating film. Next, the mold 1 was pressed against the coating film so that the surface of the coating film opposite to the substrate film and the surface of the mold 1 (the surface on which the fine structure was formed) were in contact. Thereafter, the coating film was cured by performing UV light irradiation, and a thermosetting tacky layer (second adhesive layer, thickness: 120 μm) was formed.

Figure 15A:
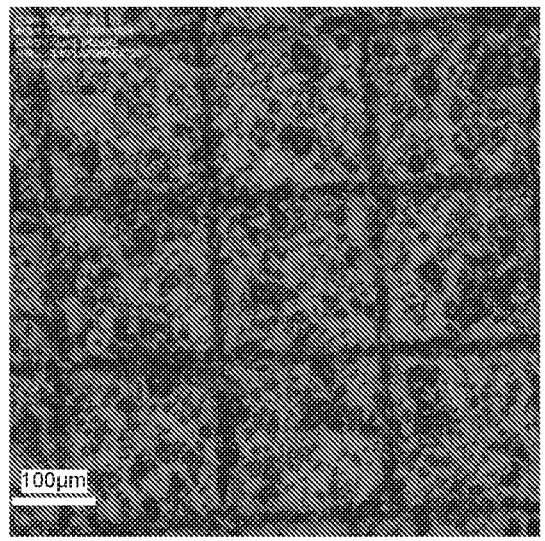
FIG. 15($a$) is a laser microscopic image of an adhesive sheet of Example 1, and (b) is an optical microscopic image illustrating an adhesive surface between the adhesive sheet of Example 1 and a glass substrate.
Figure 15B:
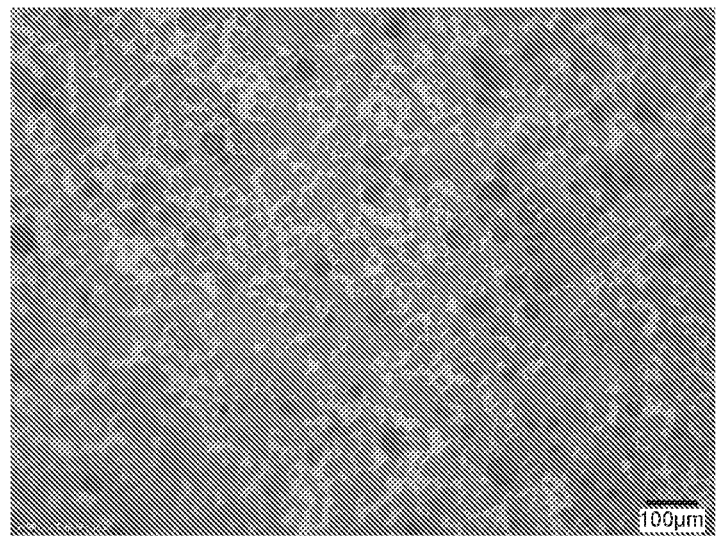

Next, after removing the mold 1 from the laminate of the substrate film, the tacky layer and the mold 1 obtained above, Scotchkote™ 206N was evenly applied to the surface by sprinkling it onto the surface of the tacky layer (the surface to which the mold 1 was attached). As a result, a surface layer (first adhesive layer, thickness: 31 μm) made of a deposit of Scotchkote™ 206N was formed on the tacky layer. By the above operation, an adhesive sheet including the tacky layer (second adhesive layer) and the surface layer (first adhesive layer) was obtained. The surface of the adhesive sheet on the surface layer side was observed with a laser microscope, and it was confirmed that a plurality of convex structures were formed on the surface. The glass substrate was also disposed on the surface layer of the adhesive sheet, and a contact state between the adhesive sheet and the glass substrate was observed using an optical microscope (magnification: 10×). The observed laser microscopic image and optical microscopic image are illustrated in FIGS. 15(a) and 15(b), respectively.

TABLE 2

|  | Blending proportion (parts by mass) |
| --- | --- |
| NPPN442 | 8.980 |
| FA-513M | 3.010 |
| GMA | 3.010 |
| MX-217 | 12.020 |
| EML-101 | 0.600 |
| 2MZA-PW | 0.450 |
| DICY1200F | 2.069 |
| Irgacure 651 | 0.009 |
| Irganox1010 | 0.027 |
| $CBr_4$ | 0.007 |

Experimental Example 2

Scotchkote™ 206N was dissolved in MEK to obtain a solution of an adhesive composition (solid content: 30 mass %). The resulting solution was applied to the surface of the mold 1 (surface on which a fine structure was formed) using a hand coater, and dried. As a result, an adhesive layer (first adhesive layer, thickness: 30 μm) made of the adhesive composition was formed on the mold 1.

Next, after obtainment of a mixed liquid in the same manner as in Experiment Example 1, the obtained mixed liquid was applied onto a substrate film (PET film) and dried to form a coating film. Thereafter, the coating film was cured by performing light irradiation under the same conditions as in Experimental Example 1, and a thermosetting tacky layer (second adhesive layer, thickness: 120 μm) was formed.

Figure 16A:
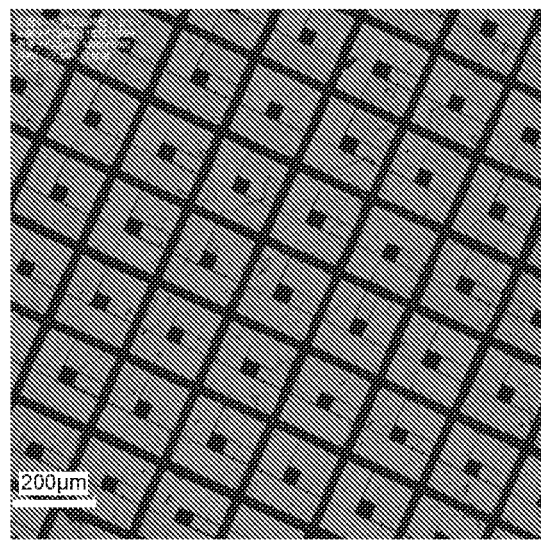
FIG. 16($a$) is a laser microscopic image of an adhesive sheet of Example 2, and (b) is an optical microscopic image illustrating an adhesive surface between the adhesive sheet of Example 2 and a glass substrate.
Figure 16B:
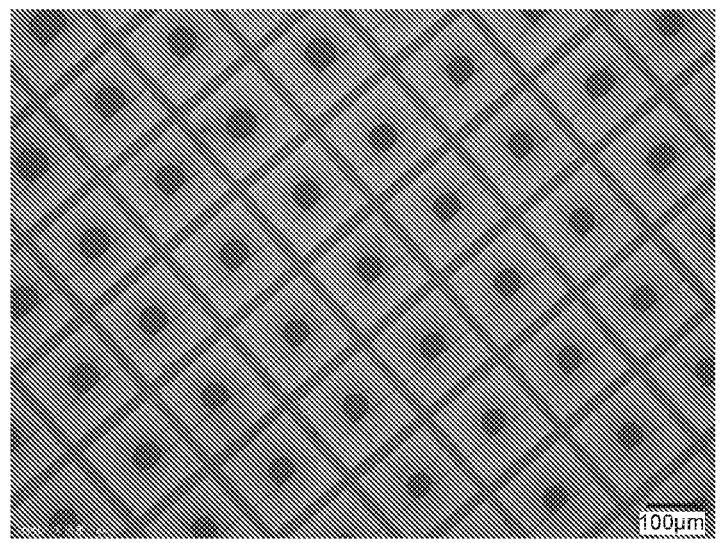

The laminate of the adhesive layer and the mold 1 obtained above was then laminated onto the tacky layer from the adhesive layer side, and a surface layer formed of the first adhesive layer on the tacky layer was formed. By the above operation, an adhesive sheet including the tacky layer (second adhesive layer) and the surface layer (first adhesive layer) was obtained. After removal of the mold 1, the surface of the adhesive sheet on the surface layer side (the surface to which the mold 1 was attached) was observed with a laser microscope, and it was confirmed that a plurality of convex structures were formed on the surface. The glass substrate was also disposed on the surface layer of the adhesive sheet, and a contact state between the adhesive sheet and the glass substrate was observed using an optical microscope (magnification: 10×). The observed laser microscopic image and optical microscopic image are illustrated in FIGS. 16(a) and 16(b), respectively.

Experimental Example 3

Figure 17A:
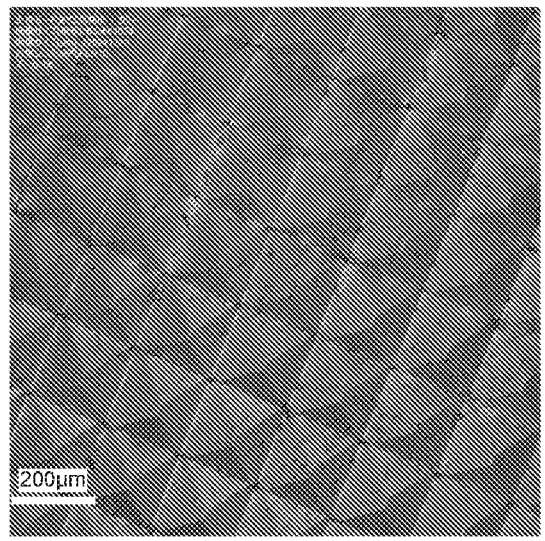
FIG. 17($a$) is a laser microscopic image of an adhesive sheet of Example 3, and (b) is an optical microscopic image illustrating an adhesive surface between the adhesive sheet of Example 3 and a glass substrate.
Figure 17B:
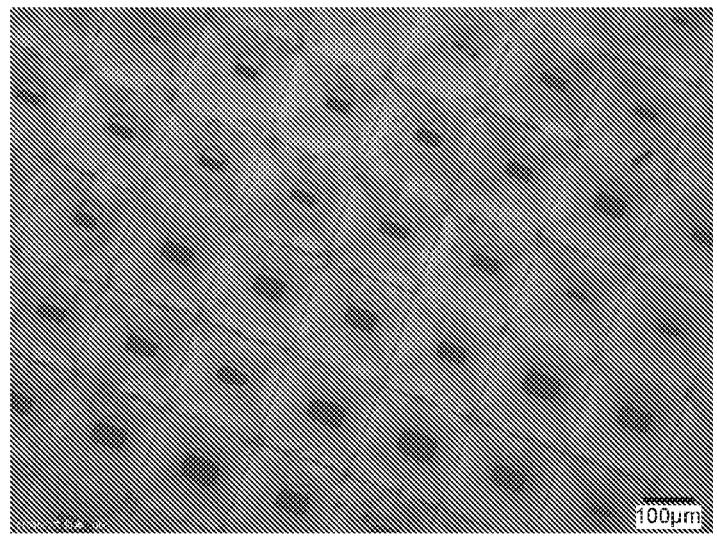

An adhesive sheet formed of a tacky layer (second adhesive layer) and a surface layer (first adhesive layer) was obtained in the same manner as in Experiment Example 2 except that the mold 2 was used instead of the mold 1. After removal of the mold 2, the surface of the adhesive sheet on the surface layer side (the surface to which the mold 2 was attached) was observed with a laser microscope, and it was confirmed that a plurality of convex structures were formed on the surface. The glass substrate was also disposed on the surface layer of the adhesive sheet, and a contact state between the adhesive sheet and the glass substrate was observed using an optical microscope (magnification: 10×). The observed laser microscopic image and optical microscopic image are illustrated in FIGS. 17(a) and 17(b), respectively.

Experimental Example 4

A thermosetting tacky layer was formed on a substrate film (PET film) in the same manner as in Experiment Example 2 except that the applied amount was changed so that the thickness was 150 μm. In Experiment Example 4, the tacky layer thus obtained was used as an adhesive sheet.

Experimental Example 5

A thermosetting tacky layer was formed on a substrate film (PET film) in the same manner as in Experiment Example 2 except that the applied amount was changed so that the thickness was 110 μm. The resulting tacky layer was then laminated onto a PET nonwoven fabric, and a surface layer made of the PET nonwoven fabric was formed on the tacky layer. In Experimental Example 5, the laminate of the tacky layer and the surface layer thus obtained was used as an adhesive sheet.

Experimental Example 6

A thermosetting tacky layer was formed on a substrate film (PET film) in the same manner as in Experiment Example 2 except that the applied amount was changed so that the thickness was 121 μm. Next, after obtainment of a solution of an adhesive composition in the same manner as in Experiment Example 2, the obtained solution was applied to the surface of the tacky layer using a hand coater, and dried. As a result, a surface layer (thickness: 30 μm) made of the adhesive composition was formed on the tacky layer. In Experimental Example 6, the laminate of the tacky layer and the surface layer thus obtained was used as an adhesive sheet.

Evaluation (Evaluation of Ease of Insertion)

The ease of insertion was evaluated based on the tack and coefficient of dynamic friction of the surface of the adhesive sheet. The evaluation method is indicated below, and the evaluation results are shown in Table 3. Note that, in this evaluation, the laminates of the adhesive sheets and the substrate films obtained in the Experimental Examples were used.

[Tack Evaluation]

SPCC-SB (cold rolled steel sheet) was prepared and the surface (adhered surface) of the SPCC-SB was washed with MEK. Thereafter, the laminate was placed on the SPCC-SB so that the surface (adhered surface) of the SPCC-SB and the surface of the adhesive sheet opposite to the substrate film were in contact with each other. The tack on the surface of the adhesive sheet was evaluated in the following criteria.

Evaluation 1: Test sample was attached to SPCC-SB
Evaluation 2: Test sample was attached to SPCC-SB and slid smoothly on the second adherend (although test sample was attached to SPCC-SB by pressing)
Evaluation 3: Test sample was not attached to SPCC-SB even by pressing Note that the evaluations were performed at room temperature (25° C.), and the pressure at the time of pressing was 1 MPa.

[Measurement of Coefficient of Dynamic Friction]

The coefficient of dynamic friction of the surface of the adhesive sheet (the surface opposite to the substrate film) in the laminate was measured in accordance with JIS K7125 "Plastics and Films—Determination of the coefficients of friction". Note that the calculation formula for the coefficient of dynamic friction is as follows.

$$\mu_D = F_D/F_P \quad \text{Formula}$$

wherein $\mu_D$ represents a coefficient of dynamic friction, $F_D$ represents a dynamic friction force, and $F_P$ represents a normal force (1.96 N) by a load cell.

(Shear Strength Evaluation)

The adhesive sheets of the experimental examples were each cut at a size of 12.5 mm×25 mm, which were used as test samples. As the adherend, two SPCC-SBs (cold rolled steel sheets, size: 1.6 mm×25 mm×50 mm) were prepared. The surfaces (adhered surfaces) of the SPCC-SBs were previously washed with MEK.

Figure 18:
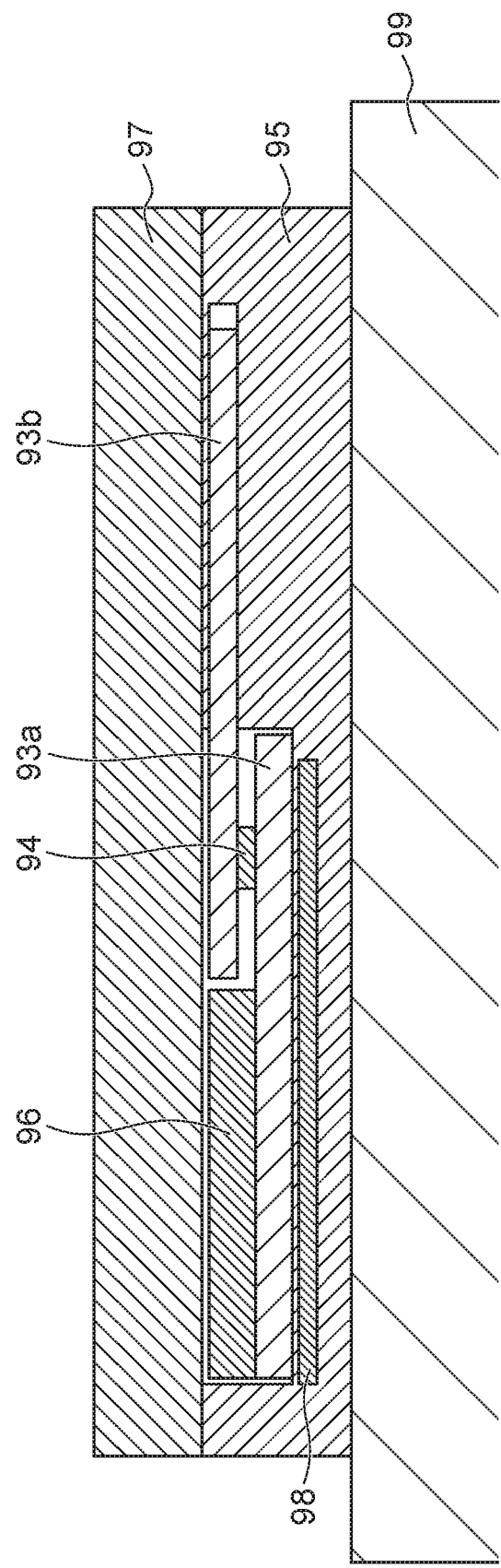
FIG. 18 is a cross-sectional view for describing a method for making a shear strength measurement sample.

The test sample was sandwiched between the two adherends (SPCC-SBs), and the laminate (first adherend/adhesive sheet/second adherend) was obtained. Then, the laminate was held between a pair of hot plates and heated at 180° C. for 15 minutes under a pressure of 100 kN, and thus the adhesive sheet was cured. Specifically, as illustrated in FIG. 18, the laminate (first adherend 93a/adhesive sheet 94/second adherend 93b) was disposed on a lower hot plate 99 via a jig 95 and a thermocouple 98, and a spacer 96 (thickness: 0.35 mm) was used to fix a gap, and then a cover plate 97 was placed on the laminate. The laminate was then heated from up and down by placing an upper hot plate (not illustrated) on the cover plate 97. When heating, the lower hot plate 99 was moved upward while the heating temperature was checked by the thermocouple 98. Thus, pressure was applied to the laminate.

The laminate after heating was used as a shear strength measurement sample, and the shear strength (overlap shear strength) of the measurement sample was measured using a Tensilon universal tester. Specifically, first, an oven of the Tensilon was heated to 150° C. The measurement sample was then set to jaws and pre-heated in the oven for 5 minutes. The shear strength was then measured when the first adherend and the second adherend were pulled in opposite directions to each other at a crosshead speed of 50 mm/min. The measurement values are shown in Table 3. In the experimental examples, it was determined that a sufficiently high shear strength was obtained when the shear strength was more than 5 MPa.

TABLE 3

| | Surface layer [μm] | Tacky layer [μm] | Total thickness [μm] | Tack | Coefficient of dynamic friction [μd] | Shear strength [MPa] |
|---|---|---|---|---|---|---|
| Experimental Example 1 | 31 | 120 | 151 | 3 | 0.22 | 6.2 |
| Experimental Example 2 | 30 | 120 | 150 | 2 | 0.38 | 6.2 |
| Experimental Example 3 | 30 | 120 | 150 | 2 | 0.38 | 6.1 |
| Experimental Example 4 | 0 | 150 | 150 | 1 | NA (>2) | 7.1 |
| Experimental Example 5 | 30 | 110 | 140 | 3 | 0.19 | 4.1 |
| Experimental Example 6 | 30 | 121 | 151 | 2 | 0.34 | 3.5 |

As shown in Table 3 above, it was confirmed that, in the adhesive sheets of Experimental Examples 1 to 3, the surface tack was suppressed, the coefficient of dynamic friction of the surface was sufficiently reduced, and favorable ease of insertion was obtained, and improved adhesiveness was obtained as compared with Experimental Example 6. When comparing Experimental Example 1 with Experimental Examples 2 and 3, there is a possibility that powder of Scotchkote™ 206N may fall off in Experimental Example 1, whereas the first adhesive layer constituting the surface layer is made of a molded body of the adhesive composition, and thus is stably affixed to the second adhesive layer which is a tacky layer in Experimental Examples 2 and 3. From the perspective of such a perspective, Experimental Examples 2 and 3 can be said to be superior in handleability to Experiment Example 1.

REFERENCE SIGNS LIST 1, 421: Bottom surface;
2, 422: Top;
3, 423: Side surface;
4, 424: Convex structure;
5, 5a, 5b, 425: fine structure;
6: Base;
10, 30, 40, 50, 60, 70: Adhesive sheet;
10a, 10b: Surface;
11, 31, 41, 51, 61, 71, 81: First outermost layer (first adhesive layer);
12, 32, 42, 52, 62, 72, 82: Second outermost layer;
15: Adherend (magnet);
16: Article;
20: Mold;
21: Concave structure;
22: fine structure;
73: First intermediate layer (second adhesive layer);
74; Second intermediate layer (substrate layer).

What is claimed is:

1. An adhesive sheet comprising:
a first adhesive layer formed of an adhesive composition containing an epoxy resin having a softening point of 50° C. or higher and a thermal curing agent; and
a second adhesive layer that has tackiness and is foamed and cured by heat,
wherein at least one outermost layer is formed of the first adhesive layer, and
the adhesive sheet has a plurality of convex structures on a surface on a side of the outermost layer formed of the first adhesive layer.

2. The adhesive sheet according to claim 1, wherein the outermost layer formed of the first adhesive layer is made of a molded body of the adhesive composition.

3. The adhesive sheet according to claim 1, wherein the outermost layer formed of the first adhesive layer is made of a deposit of the adhesive composition in powder form.

4. The adhesive sheet according to claim 1, wherein the convex structures have a height from 2 to 200 μm.

5. The adhesive sheet according to claim 1, further comprising a substrate layer as an intermediate layer.

6. The adhesive sheet according to claim 1, wherein one outermost layer is formed of the second adhesive layer.

7. The adhesive sheet according to claim 1,
wherein both outermost layers are formed of the first adhesive layer, and
the adhesive sheet has the plurality of convex structures on both surfaces.

8. An article comprising:
the adhesive sheet described in claim 1; and
an adherend having the adhesive sheet attached thereto.

9. A method for manufacturing an adhesive sheet having a plurality of convex structures on a surface, the method comprising:
molding a first adhesive layer by applying a solution containing an epoxy resin having a softening point of 50° C. or higher and a thermal curing agent onto a surface of a mold having a plurality of concave structures on the surface, and
providing a second adhesive layer that has tackiness and is foamed and cured by heat, on a side of the first adhesive layer opposite to the mold.

10. A method for manufacturing an adhesive sheet having a plurality of convex structures on a surface, the method comprising:
forming an adhesive layer that has tackiness and is foamed and cured by heat, on a surface of a mold having a plurality of concave structures on the surface, and thus forming a plurality of convex structures on a surface of the adhesive layer; and
depositing, on the surface of the adhesive layer, a powdery adhesive composition containing an epoxy resin having a softening point of 50° C. or higher and a thermal curing agent.

11. A method for manufacturing an article including a first element, a second element, and a filling portion that fills a space between the first element and the second element, the method comprising:
disposing the adhesive sheet described in claim 1 between the first and second elements; and
thermally expanding and curing the adhesive sheet by heating to form the filling portion.

* * * * *